US012462675B2

(12) United States Patent
Yamada et al.

(10) Patent No.: US 12,462,675 B2
(45) Date of Patent: Nov. 4, 2025

(54) TRAFFIC PREDICTION SYSTEM, TRAFFIC PREDICTION METHOD, AND PROGRAM

(71) Applicant: TOYOTA JIDOSHA KABUSHIKI KAISHA, Toyota (JP)

(72) Inventors: Masaki Yamada, Nagoya (JP); Yuji Tamura, Saitama (JP); Ryota Horiguchi, Matsudo (JP); Koji Takahashi, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 18/228,834

(22) Filed: Aug. 1, 2023

(65) Prior Publication Data

US 2024/0054889 A1 Feb. 15, 2024

(30) Foreign Application Priority Data

Aug. 9, 2022 (JP) ................................ 2022-127344

(51) Int. Cl.
*G08G 1/01* (2006.01)

(52) U.S. Cl.
CPC .................................. *G08G 1/0125* (2013.01)

(58) Field of Classification Search
CPC .................................................... G08G 1/0125
See application file for complete search history.

(56) References Cited

U.S. PATENT DOCUMENTS

| | | | | |
|---|---|---|---|---|
| 2014/0088871 A1* | 3/2014 | Gueziec | ................. | G01C 21/30 701/533 |
| 2015/0360688 A1 | 12/2015 | Tanaka et al. | | |
| 2022/0003567 A1* | 1/2022 | Kim | ................... | G01C 21/3446 |
| 2022/0092974 A1* | 3/2022 | McCabe | ................ | G06Q 10/00 |

FOREIGN PATENT DOCUMENTS

| | | |
|---|---|---|
| JP | 2000-231690 A | 8/2000 |
| JP | 2013-235326 A | 11/2013 |
| JP | 5523886 B2 | 6/2014 |
| JP | 2019-101445 A | 6/2019 |
| JP | 2019-114300 A | 7/2019 |
| WO | 2014/118962 A1 | 8/2014 |

OTHER PUBLICATIONS

Jiang Jincheng et al., Modelling traffic flows and estimating road travel times in transportation network under dynamic disturbances, Transportation, Springer US, New York, vol. 47, No. 6, Issued on Apr. 1, 2019, pp. 2951-2980, ISSN: 0049-4488, https://10.1007/s11116-019-09997-3.

* cited by examiner

*Primary Examiner* — Mathew Franklin Gordon
(74) *Attorney, Agent, or Firm* — Dinsmore & Shohl LLP

(57) ABSTRACT

A traffic data acquisition unit acquires traffic volume data. A required time acquisition unit acquires an actual value of a required time. A traffic volume calculation unit calculates an inflow traffic volume of vehicles flowing into each using the traffic volume data and the actual value of the required time. A traffic state prediction unit calculates, for each route, a predicted value of the required time in view of the calculated inflow traffic volume and a predicted value of the required time when the inflow traffic volume is changed using a traffic model generated in advance. An amount of change calculation unit calculates, for each route, an amount of change in the predicted value of the required time when the inflow traffic volume is changed.

6 Claims, 20 Drawing Sheets

TRAFFIC PREDICTION SYSTEM, TRAFFIC PREDICTION METHOD, AND PROGRAM

CROSS REFERENCE TO RELATED APPLICATIONS

This application is based upon and claims the benefit of priority from Japanese patent application No. 2022-127344, filed on Aug. 9, 2022, the disclosure of which is incorporated herein in its entirety by reference.

BACKGROUND

The present disclosure relates to a traffic prediction system, a traffic prediction method, and a program. In particular, the present disclosure relates to a traffic prediction system, a traffic prediction method, and a program that monitor vehicular traffic.

There is a technique to predict traffic in a traffic network (road) where vehicles pass through. For example, Japanese Patent No. 5523886 discloses a prediction calculation apparatus which defines a road with a plurality of entrances and a plurality of exits as a road being formed of a plurality of links of a predetermined length and predicts movement states of a plurality of vehicles moving from the entrance to the exit for each link. In the prediction calculation apparatus described in Japanese Patent No. 5523886, an entrance traffic volume prediction unit calculates the number of vehicles entering from the entrance for each entrance as the number of inflow vehicles based on traffic volume information indicating a traffic volume of vehicles observed on the road. A sudden event response unit estimates an exit that a vehicle may select based on obstacle information indicating an event that may interfere with the movement of vehicles, and generates corrected origin and destination information by multiplying standard origin and destination information indicating a traffic volume in a standard movement state from the entrance to the exit by a conversion rate generated based on the predicted exit. A reference situation calculation unit calculates movement velocities of the vehicles for each link based on the corrected origin and destination information. Based on the calculated number of inflow vehicles and the calculated movement velocities, the prediction calculation unit calculates a section travel time to a destination to which the vehicles move by a predetermined time and predicts a traffic state.

SUMMARY

A traffic volume on a road (route) may change as a behavior is modified, such as changing transportation means of a vehicle from an entrance to an exit of a road (route). In this case, it is desirable to efficiently predict a change in a time (travel time) required to pass through a road (route). Japanese Patent No. 5523886 uses data (infrastructure data) collected by equipment (such as traffic counters) managed by a road administrator. However, it is not easy to acquire such data (infrastructure data) at a desired point. Therefore, the technique described in Japanese Patent No. 5523886 may not be able to efficiently predict a change in a travel time when a traffic volume on a route is changed as a behavior is modified.

The present disclosure provides a traffic prediction system, a traffic prediction method, and a program that can efficiently predict a change in a travel time required to pass through a route when traffic volume on the route changes as a behavior is modified.

A traffic prediction system according to the present disclosure includes: a traffic data acquisition unit configured to acquire traffic volume data indicating a relationship between a time and a traffic volume at a predetermined point; a required time acquisition unit configured to acquire, for each route, an actual value of a required time from a reference point of at least one route to the predetermined point for a vehicle to arrive at the predetermined point via the route; a traffic volume calculation unit configured to calculate an inflow traffic volume of vehicles flowing into the route from the reference point using the traffic volume data and the actual value of the required time; a traffic state prediction unit configured to calculate, for the route, a predicted value of the required time in view of the calculated inflow traffic volume and a predicted value of the required time when the inflow traffic volume is changed using a traffic model generated in advance; and an amount of change calculation unit configured to calculate, for the route, an amount of change in the predicted value of the required time when the inflow traffic volume is changed.

A traffic prediction method according to the present disclosure includes: acquiring traffic volume data indicating a relationship between a time and a traffic volume at a predetermined point; acquiring, for each route, an actual value of a required time from a reference point of at least one route to the predetermined point for a vehicle to arrive at the predetermined point via the route; calculating an inflow traffic volume of vehicles flowing into the route from the reference point using the traffic volume data and the actual value of the required time; calculating, for the route, a predicted value of the required time in view of the calculated inflow traffic volume and a predicted value of the required time when the inflow traffic volume is changed using a traffic model generated in advance; and calculating, for the route, an amount of change in the predicted value of the required time when the inflow traffic volume is changed.

A program according to the present disclosure causes a computer to execute processing of: acquiring traffic volume data indicating a relationship between a time and a traffic volume at a predetermined point; acquiring, for each route, an actual value of a required time from a reference point of at least one route to the predetermined point for a vehicle to arrive at the predetermined point via the route; calculating an inflow traffic volume of vehicles flowing into the route from the reference point using the traffic volume data and the actual value of the required time; calculating, for the route, a predicted value of the required time in view of the calculated inflow traffic volume and a predicted value of the required time when the inflow traffic volume is changed using a traffic model generated in advance; and calculating, for the route, an amount of change in the predicted value of the required time when the inflow traffic volume is changed.

In the present disclosure, with such a configuration, the change in the required time when the inflow traffic volume is changed can be predicted without acquiring infrastructure data. Therefore, the present disclosure makes it possible to efficiently predict the change in the travel time required to pass through the route when the traffic volume on the route changes as a behavior is modified.

The required time acquisition unit may be configured to acquire the actual value of the required time using travel performance data obtained from each of specific vehicles passing through the route.

The travel performance data (i.e., travel actual performance data) is obtained from specific vehicles that can be managed by a system administrator. Therefore, it is easy for the system administrator to acquire the travel performance data. Thus, the present disclosure makes it possible to easily acquire the actual value of the required time.

The required time acquisition unit may acquire the actual value of the required time for each of a plurality of the routes to the predetermined point, the traffic volume calculation unit may calculate the inflow traffic volume for each of the plurality of the routes using the traffic volume data and the actual value of the required time, the traffic state prediction unit may calculate, for each of the plurality of the routes, the predicted value of the required time in view of the calculated inflow traffic volume and the predicted value of the required time when the inflow traffic volume is changed, and the traffic state prediction unit may calculate, for each of the plurality of the routes, the amount of change in the predicted value of the required time when the inflow traffic volume is changed.

With such a configuration, it is possible to predict which route has a large amount of change in the required time. Therefore, it is possible to determine which route is most effective for behavior modification.

The required time acquisition unit may acquire the actual value of the required time using travel performance data obtained from each of a plurality of the specific vehicles passing through each of the plurality of the routes, and the traffic volume calculation unit may calculate the inflow traffic volume for each of the plurality of the routes, using a share ratio of each route to the traffic volume in the traffic volume data, the share ratio being calculated based on the number of the specific vehicles passing through each of the plurality of the routes.

With such a configuration, the inflow traffic volume on each route can be calculated without acquiring infrastructure data.

The traffic volume calculation unit may calculate the outflow accumulated traffic volume which is the accumulation of outflow traffic volume which is the traffic volume outflow from each of the plurality of routes among the traffic volumes in the traffic volume data using the share ratio, calculate the inflow accumulated traffic volume which is the accumulation of the inflow traffic volume using the outflow accumulated traffic volume and the actual value of the required time, and calculate the inflow traffic volume for each time from the inflow accumulated traffic volume.

This configuration makes it possible to calculate the inflow traffic volume on each route without acquiring the infrastructure data.

The traffic model may be generated by adjusting parameters of the traffic model so as to reproduce the actual value of the required time when the inflow traffic volume is input to the traffic model.

With such a configuration, it is possible to accurately calculate the predicted value of the required time from the inflow traffic volume.

The parameters of the traffic model may include a bottleneck capacity of each route in each time.

With such a configuration, it is possible to calculate the predicted value of the required time that satisfactorily reproduces the actual value of the required time. Therefore, in this embodiment, it is possible to accurately predict the required time and the outflow traffic volume.

According to the present disclosure, it is possible to provide a traffic prediction system, a traffic prediction method, and a program that can efficiently predict a change in a travel time required to pass through a route when traffic volume on the route changes as a behavior is modified.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
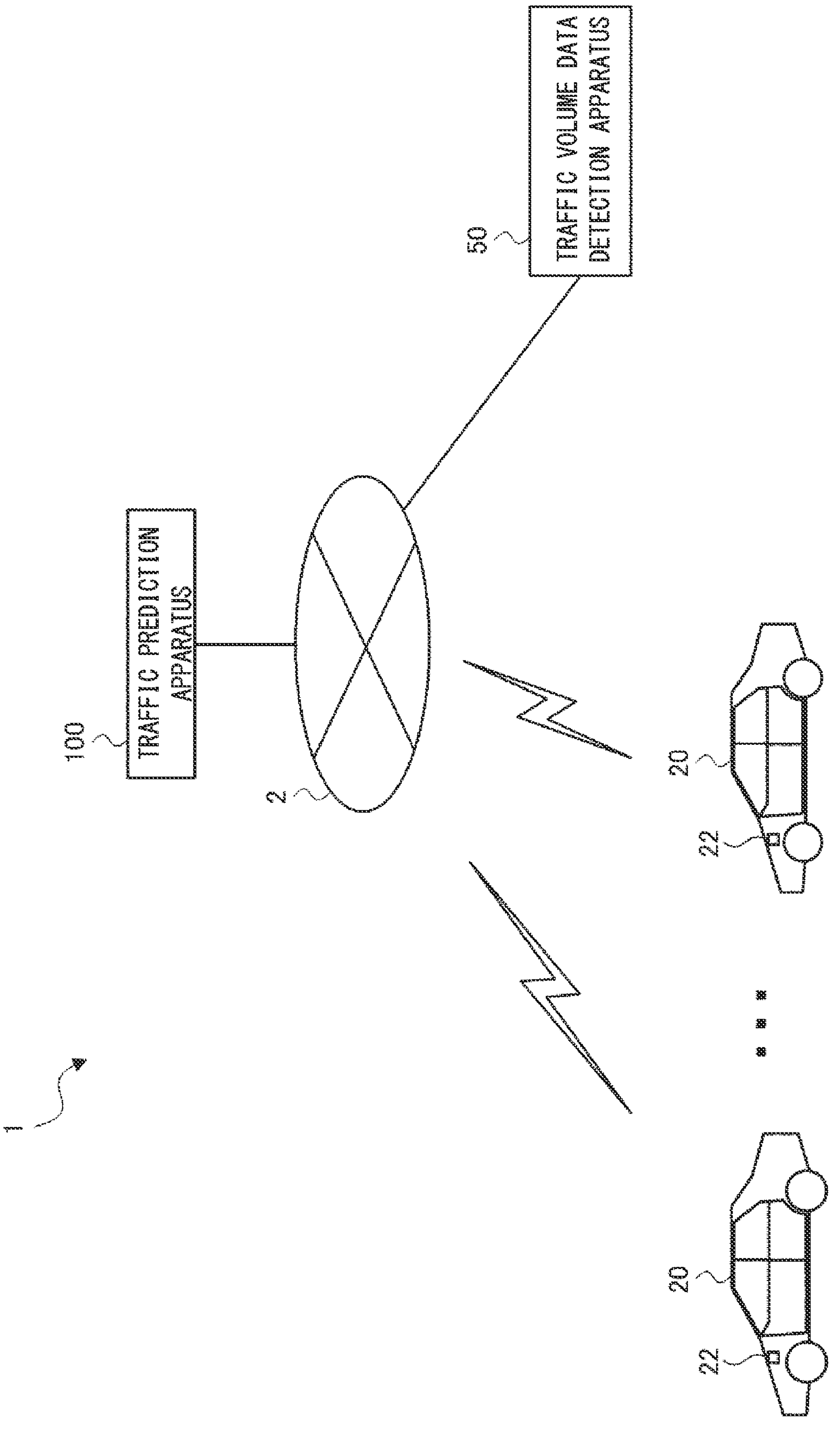
FIG. 1 shows a traffic prediction system according to a first embodiment.

Embodiments of the present disclosure will be described below with reference to the drawings. Note that substantially the same components are denoted by the same signs. In the drawings shown below, the data of each graph, etc., may not correspond to each other strictly, because they are shown as examples for use in explaining the embodiments.

FIG. 1 shows a traffic prediction system 1 according to a first embodiment. A traffic prediction system 1 according to the first embodiment has a traffic prediction apparatus 100, a plurality of probe cars 20, and at least one traffic volume data detection apparatus 50. The traffic prediction apparatus 100 is communicatively connected to the probe cars 20 and the traffic volume data detection apparatus 50 via a wired or wireless network 2.

The probe cars 20 are vehicles configured to transmit probe data to the traffic prediction apparatus 100. The probe data is operational performance data (travel performance data) of the probe cars 20. When the probe cars 20 travel, the information processing apparatus 22 mounted on each of the probe cars 20 acquires the probe data by the sensor mounted on the probe car 20. The information processing apparatus 22 transmits the probe data to the traffic prediction apparatus 100 via the network 2. The probe data may be transmitted to an apparatus other than the traffic prediction apparatus 100. In this case, the traffic prediction apparatus 100 receives (acquires) the probe data from this apparatus.

The probe data includes, for example, identification information, time, position information, section information (link information), velocity information, congestion information and the like of the corresponding probe car 20. The section information (link information) is information about a section between certain points. The congestion information can be detected by, for example, a car navigation system. The probe data can be used to determine the time the probe car has passed a certain point and its velocity at that time. Alternatively, the probe data can be used to determine the time required for the probe car 20 to pass through a certain section in a certain time period (the time required may be referred to as a travel time). The probe data will be described in detail later.

The traffic volume data detection apparatus 50 is configured to detect the traffic volume at a predetermined point. The traffic volume data detection apparatus 50 is managed by an administrator (system administrator) of the traffic prediction system 1. Moreover, the "predetermined point" is, for example, an entrance of a facility that can be managed by the system administrator. The "predetermined point" may be, for example, an entrance to a facility parking lot that can be managed by the system administrator (facility administrator). In this case, the traffic volume data detection apparatus 50 is installed near an entrance gate of the parking lot. The traffic volume data detection apparatus 50 counts the number of vehicles entering the parking lot in association with the time. In this way, the traffic volume data detection apparatus 50 detects the traffic volume at the entrance gate of the parking lot. The traffic volume data will be described in detail later.

The traffic prediction apparatus 100 is, for example, a computer such as a server. The traffic prediction apparatus 100 may be implemented by cloud computing. As described later, the traffic prediction apparatus 100 calculates the traffic volume on each of the plurality of routes ending at the predetermined point using the traffic volume data and the probe data. Here, each of the plurality of routes starts at a predetermined reference point. The traffic prediction apparatus 100 then uses a traffic model, which has been generated in advance, to predict, for each of the plurality of routes, an amount of change in the time required (travel time) for the vehicle to pass through the route from the reference point to a predetermined point when the traffic volume is changed. Hereinafter, a time (travel time) required for a vehicle to pass through a route from a reference point of the route to a predetermined point may be referred to simply as a "required time for the route". The traffic prediction apparatus 100 will be described in detail later. The aforementioned "traffic model" is also used to predict the required time for each route. Details thereof will be described later.

Figure 2:
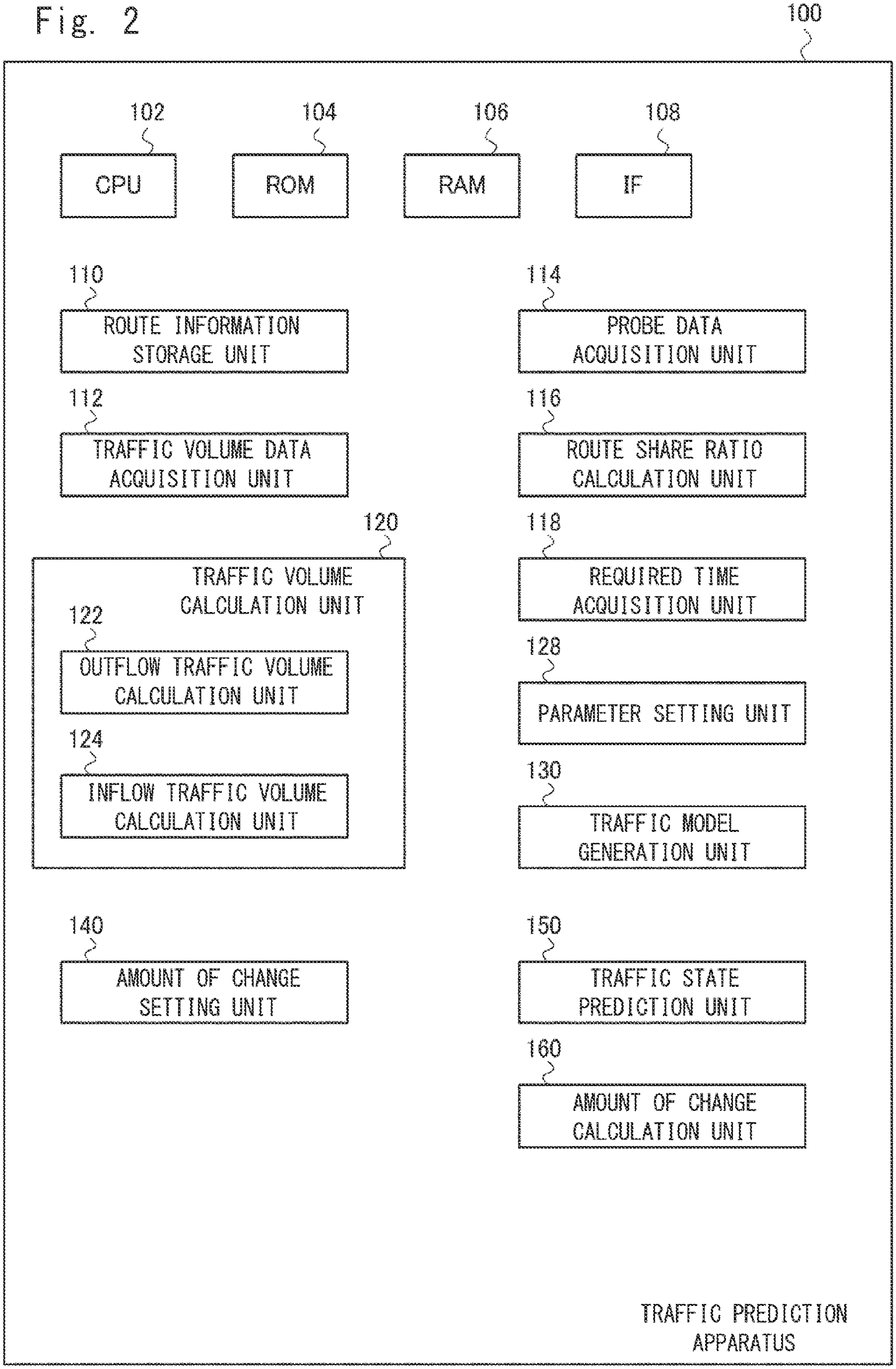
FIG. 2 shows a configuration of the traffic prediction apparatus according to the first embodiment.
Figure 3:
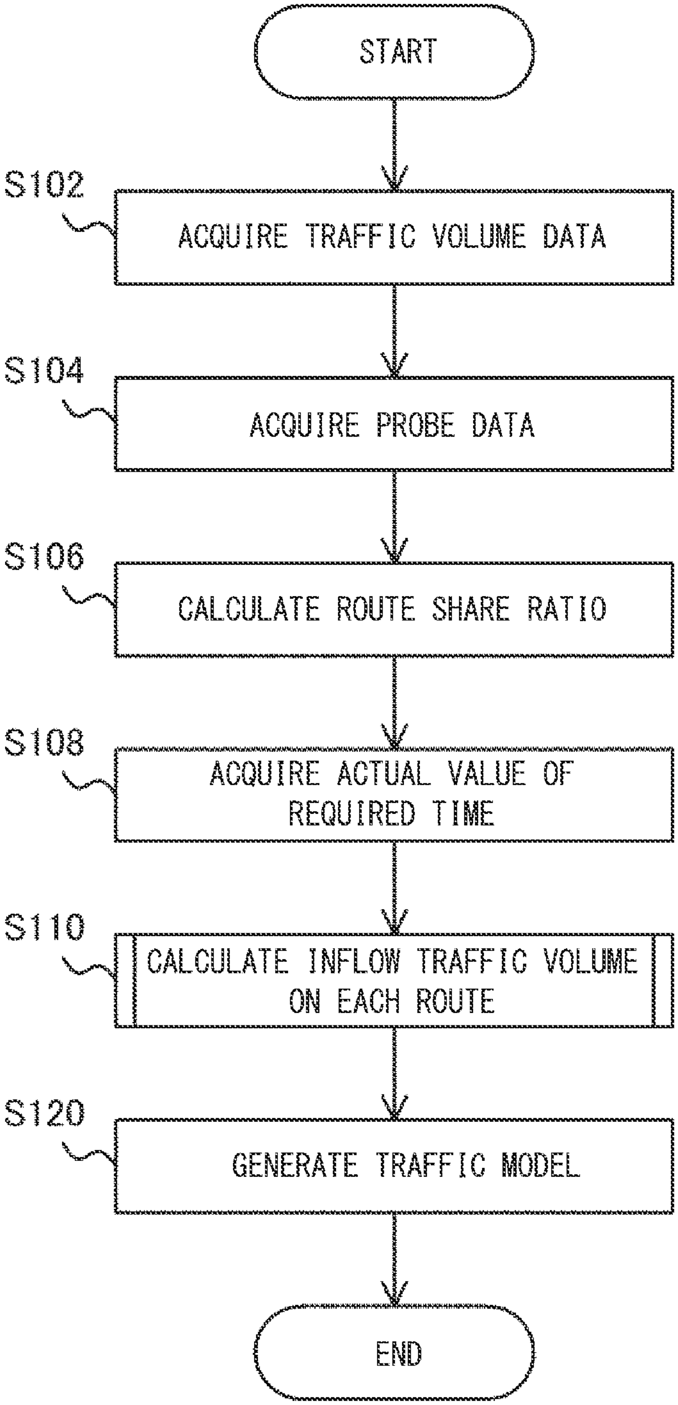
FIG. 3 is a flowchart showing a traffic prediction method executed by the traffic prediction system according to the first embodiment.
Figure 4:
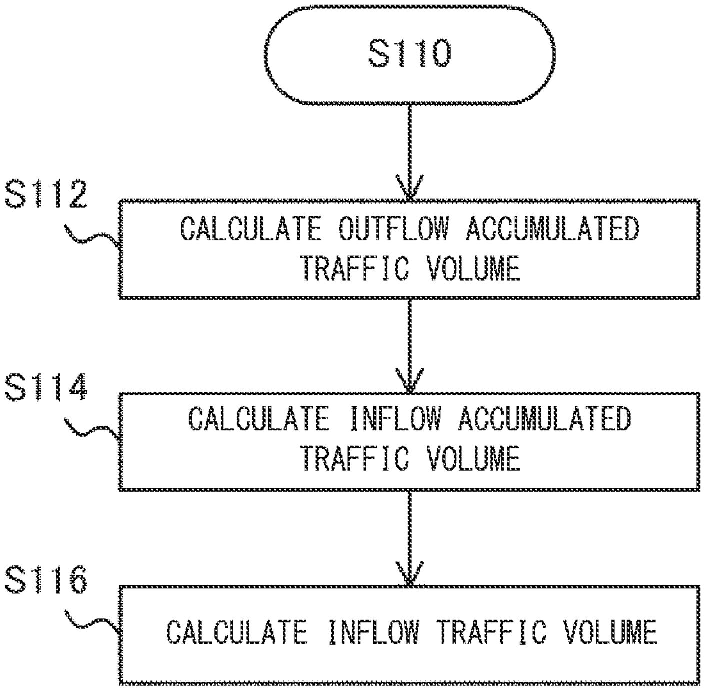
FIG. 4 is a flowchart showing the traffic prediction method executed by the traffic prediction system according to the first embodiment.
Figure 5:
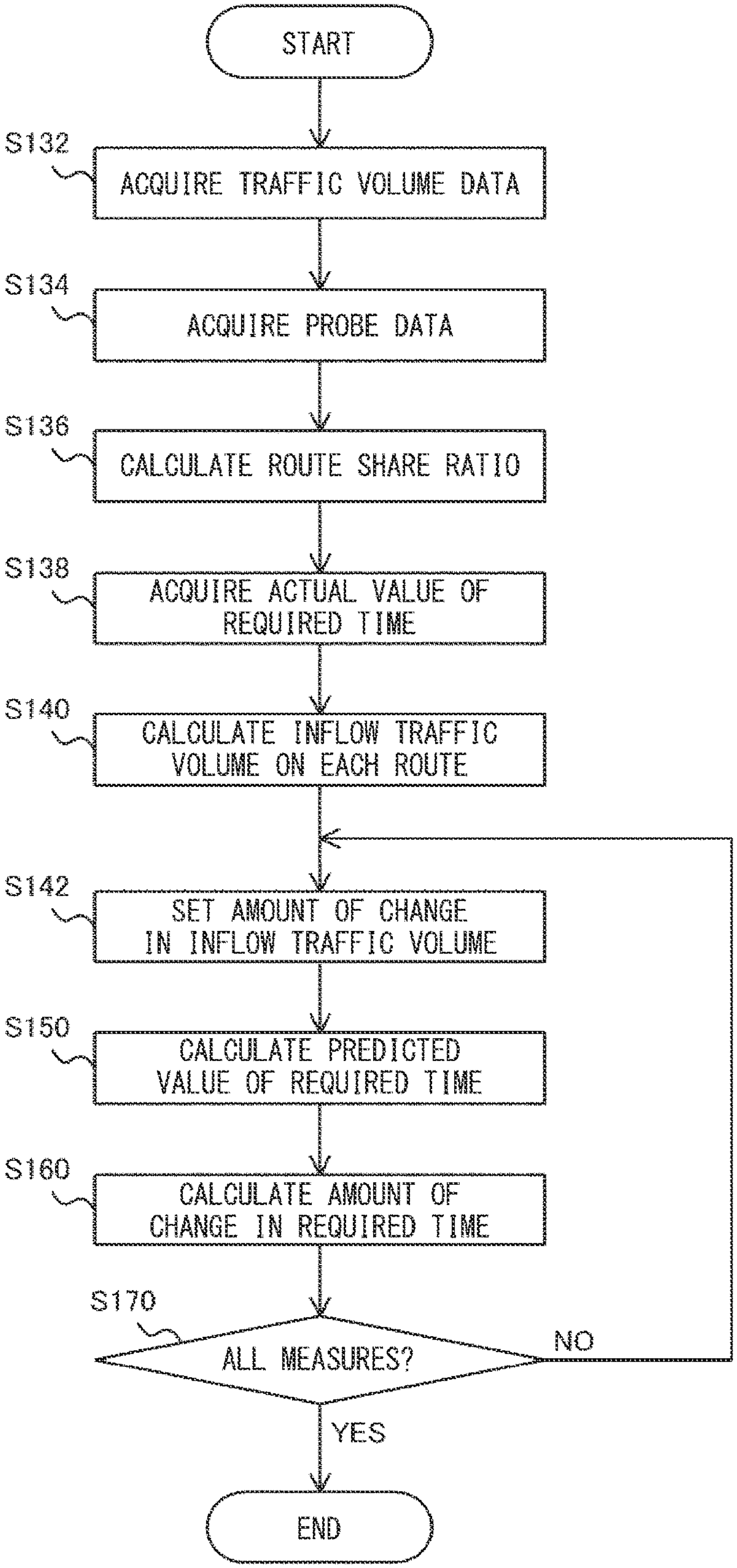
FIG. 5 is a flowchart showing the traffic prediction method executed by the traffic prediction system according to the first embodiment.

FIG. 2 shows a configuration of the traffic prediction apparatus 100 according to the first embodiment. FIGS. 3 to 5 are flowcharts showing a traffic prediction method executed by the traffic prediction system 1 according to the first embodiment. The traffic prediction apparatus 100 according to the first embodiment includes a CPU (Central Processing Unit) 102, a ROM (Read Only Memory) 104, a RAM (Random Access Memory) 106, and an interface unit 108 (IF; Interface) as its main hardware configuration. The CPU 102, the ROM 104, the RAM 106, and the interface unit 108 are connected to each other via a data bus or the like. Note that the information processing apparatus 22 may have a configuration substantially similar to a hardware configuration of the traffic prediction apparatus 100.

The CPU 102 has a function as an arithmetic apparatus that performs control processing, arithmetic processing, and the like. The ROM 104 has a function for storing a control program, an arithmetic program, and the like executed by the CPU 102. The RAM 106 has a function for temporarily storing processing data, and the like. The RAM 106 may have a database. In this way, the traffic prediction apparatus 100 may implement a database. The interface unit 108 inputs and outputs signals to and from the outside in a wired or wireless manner. The interface unit 108 also accepts (i.e., receives) an operation of data input by a user and displays information to the user.

As functional components, the traffic prediction apparatus 100 according to the first embodiment includes a route information storage unit 110, a traffic volume data acquisition unit 112, a probe data acquisition unit 114, a route share ratio calculation unit 116, and a required time acquisition unit 118. The traffic prediction apparatus 100 according to the first embodiment also has a traffic volume calculation unit 120, a parameter setting unit 128, and a traffic model generation unit 130. The traffic prediction apparatus 100 according to the first embodiment also includes an amount of change setting unit 140, a traffic state prediction unit 150, and an amount of change calculation unit 160. The traffic volume calculation unit 120 according to the first embodiment also has an outflow traffic volume calculation unit 122, and an inflow traffic volume calculation unit 124.

These components can be implemented by, for example, the CPU 102 executing the programs stored in the ROM 104. In addition, each component may be implemented by recording a necessary program on any non-volatile recording medium and installing it as needed. It should be noted that each component is not limited to being implemented by software as described above, and instead may be implemented by hardware such as some circuit elements. In addition, one or more of the above components may be implemented by physically separate pieces of hardware respectively. These are the same in the other embodiment described later.

The route information storage unit 110 is configured to store route information about a plurality of routes ending at predetermined points. The route information includes identification information (route identification information) about the routes managed by the traffic prediction system 1, position information about the reference points of the routes (starting points of the routes), position information about middle points of the routes (sections), and position information about the predetermined points (ending points of the routes). The route information may also include identification information about the probe cars 20 that are supposed to pass through the routes.

Figure 6:
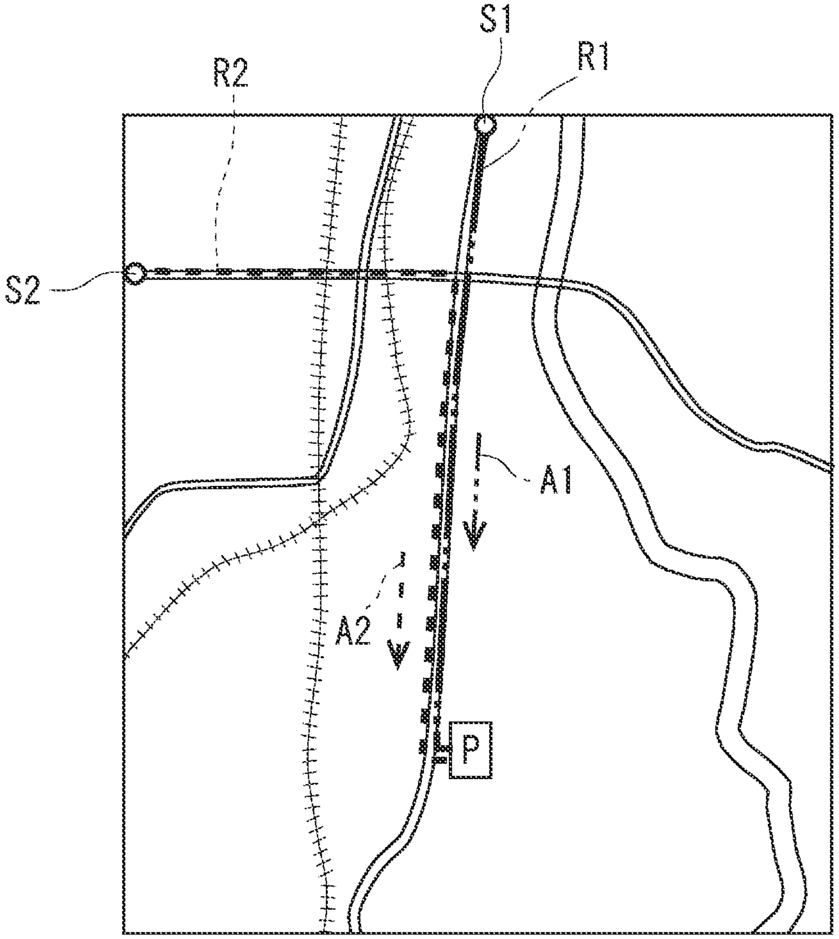
FIG. 6 shows an example of the route according to the first embodiment.

FIG. 6 shows an example of routes according to the first embodiment. FIG. 6 shows two routes R1 and R2. The route R1 is from a reference point S1 to a predetermined point P as indicated by an arrow A1. The route R2 is from a reference point S2 to a predetermined point P as indicated by an arrow A2. For example, the predetermined point P is a predetermined facility. More specifically, the predetermined point P is a company parking lot. For example, the routes R1 and R2 are routes through which the commuting vehicles (employee vehicles) of a large number of employees of a company pass during commuting. The employee vehicles may be referred to as entry vehicles that are supposed to enter the parking lot. The employee vehicles may also be referred to as target vehicles that are subject to be monitored in this embodiment.

Some of the large number of employee vehicles passing through the routes R1 and R2 are the probe cars 20 (specific vehicles). The number of probe cars 20 passing through the routes R1 and R2 is then determined according to a proportion of the large number of employee vehicles passing through each of the routes R1 and R2. In other words, the number of probe cars 20 is set in such a way that the more employee vehicles (target vehicles) that pass through a route, the more probe cars (specific vehicles) that pass through that route.

The functions of the above components are described below using flowcharts shown in FIGS. 3 to 5. FIG. 3 is flowchart showing processing of generating a traffic model according to the first embodiment. The traffic volume data acquisition unit 112 acquires the traffic volume data from the traffic volume data detection apparatus 50 (Step S102). That is, the traffic volume data acquisition unit 112 is configured to acquire the traffic volume data indicating a relationship between a time and a traffic volume at a predetermined point. The traffic volume data acquisition unit 112 may store the acquired traffic volume data in a database included in the RAM 106.

The traffic volume data is data indicating the relationship between the time and the number of vehicles passing through the predetermined point P per unit time at that time. In this embodiment, the “time” does not need to indicate a precise time, and instead may be a time period of a predetermined period of time (for example, a time period every 5 minutes). In the example of FIG. 6, the “traffic volume” in the traffic volume data is, for example, the number of vehicles entering a parking lot per unit time (the number of vehicles entering a facility).

Figure 7:
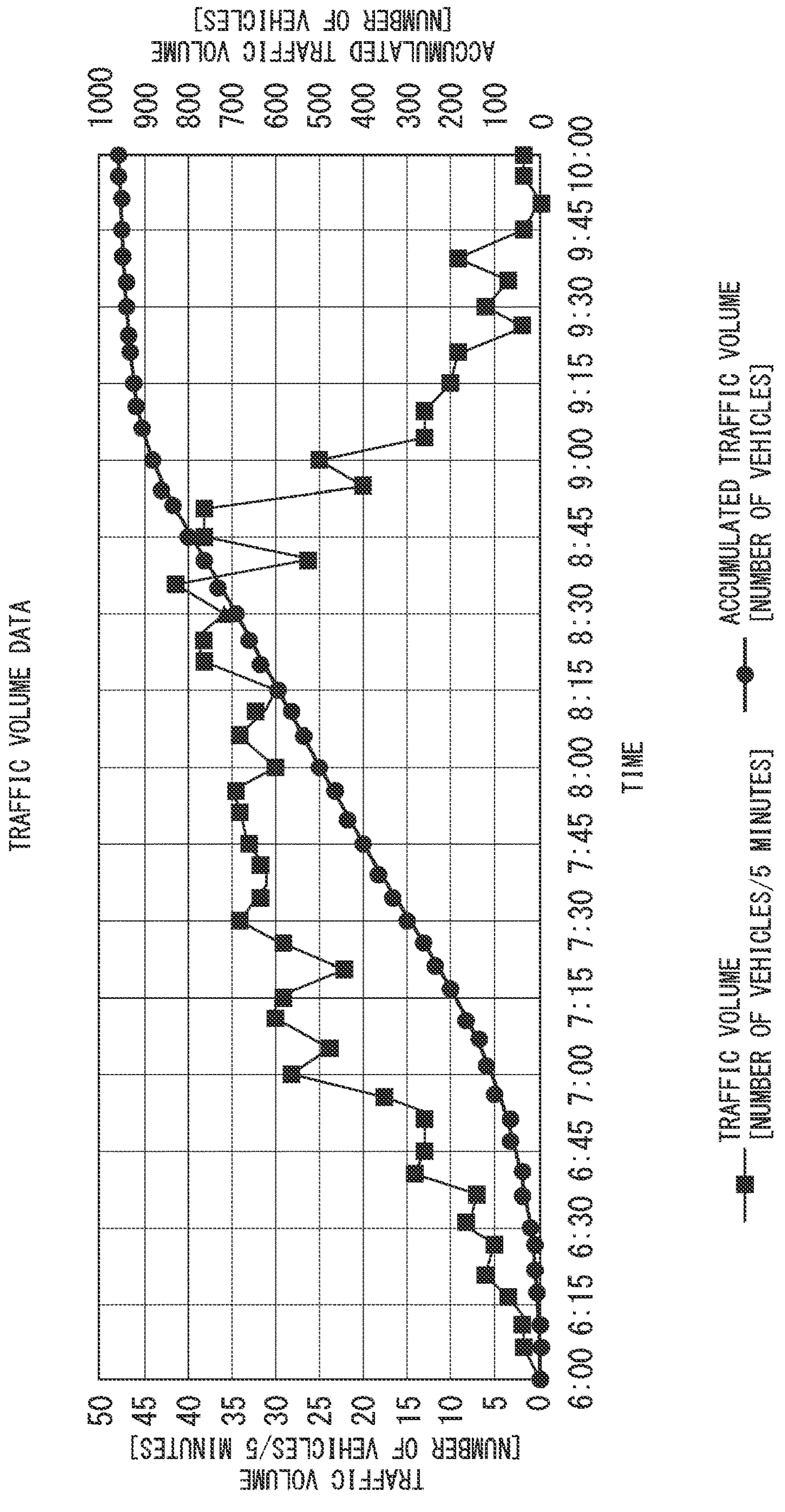
FIG. 7 shows an example of traffic volume data according to the first embodiment.

FIG. 7 is a diagram for explaining an example of the traffic volume data according to the first embodiment. The square dots in FIG. 7 indicate an hourly transition of the number of vehicles entering a parking lot per 5 minutes as the traffic volume. The round dots in FIG. 7 indicate an hourly transition of an accumulated traffic volume. The accumulated traffic volume corresponds to hourly accumulation of the traffic volume. In FIG. 7, the horizontal axis indicates the time, the vertical axis on the left indicates the traffic volume (traffic volume per unit time), and the vertical axis on the right shows the accumulated traffic volume.

The traffic volume data indicates the traffic volume at the predetermined point P, which is the ending point of each route. Therefore, the traffic volume indicated by the traffic volume data corresponds to the total number of vehicles (employee vehicles) passing through each route. Assuming that FIGS. 6 and 7 correspond to each other, the traffic volume data in FIG. 7 corresponds to the sum of the number of vehicles passing through the route R1 and arriving at the predetermined point P, and the number of vehicles passing through the route R2 and arriving at the predetermined point P.

The probe data acquisition unit 114 acquires the probe data from the probe cars 20 passing through each route (Step S104). That is, the probe data acquisition unit 114 is configured to acquire the probe data from each of the plurality of probe cars 20 (specific vehicles) passing through the route. The probe data acquisition unit 114 may store the acquired probe data in the database included in the RAM 106. As described above, the probe data includes the identification information, the time, the position information, the section information (link information), the velocity information, the congestion information and the like of the corresponding probe car 20. The probe data may further include route identification information about the route through which the corresponding probe car 20 passes.

The route share ratio calculation unit 116 calculates a route share ratio using the probe data (Step S106). That is, the route share ratio calculation unit 116 is configured to calculate the route share ratio using the probe data. The route share ratio indicates a proportion at which the traffic volume in the traffic volume data acquired in S102 is assigned to each route.

Specifically, the route share ratio calculation unit 116 calculates the share ratio of each route to the traffic volume in the traffic volume data based on the number of specific vehicles passing through each of the plurality of routes. More specifically, the route share ratio calculation unit 116 calculates a proportion of the number of probe cars 20 passing through each route in the total number of probe cars 20 arriving at the predetermined point P as the share ratio of each route. For example, assume that the total number of probe cars 20 arriving at the predetermined point P is 10, the number of probe cars 20 passing through the route R1 is 7, and the number of probe cars 20 passing through the route R2 is 3. In this case, the route share ratio calculation unit 116 calculates the route share ratio of the route R1 to be 70%, and the route share ratio of the route R2 to be 30%.

The required time acquisition unit 118 acquires an actual value of the required time (Step S108). That is, the required time acquisition unit 118 is configured to acquire, for each route and in each time (in each time period), the actual value (actual travel time) of the required time from the reference point S of at least one route to the predetermined point P for a vehicle to arrive at the predetermined point P. Specifically, the required time acquisition unit 118 acquires (calculates) the required time using a plurality of pieces of the probe data. More specifically, the required time acquisition unit 118 calculates, for each route, the required time for each time period using the probe data acquired from the probe cars 20 passing through that route.

Figure 8:
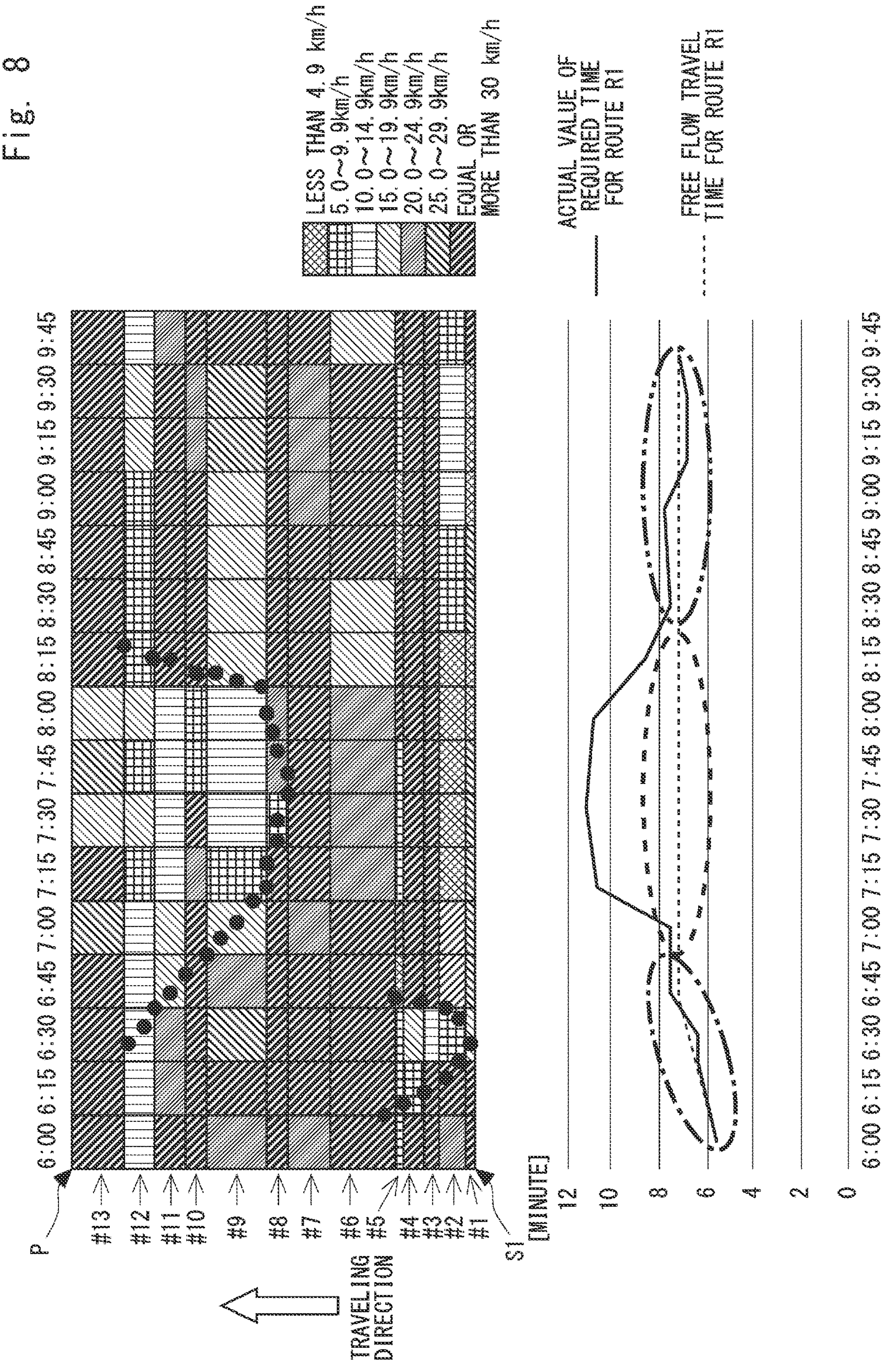
FIG. 8 is a diagram for explaining a method of acquiring a required time according to the first embodiment.

FIG. 8 is a diagram for explaining a method of acquiring the required time according to the first embodiment. The upper drawing of FIG. 8 is a contour diagram showing an average velocity in each time period in each section along the route. The lower drawing of FIG. 8 is a graph showing the actual value of the required time (travel time) in each time period corresponding to the contour diagram. FIG. 8 is the contour diagram of the route R1 and the required time of the route R1. In the following description, the processing for the route R1 is described, but the same processing is performed for the route R2.

The horizontal direction of the contour diagram and graph shown in FIG. 8 indicates the time (time period). The vertical direction of the contour diagram also indicates each section (link) of the route. The lower side in the vertical direction is the reference point S1, and the upper side in the vertical direction is the predetermined point P. Therefore, in the contour diagram, the traveling direction of the route R1 is an upward direction. In the example of FIG. 8, the route R1 has 13 predetermined sections #1 to #13 from the reference point S1 to the predetermined point P. Since the position of each section is predetermined, the distances (i.e., lengths) of the sections are also predetermined.

The hatched parts of each section in each time period correspond to an average (harmonic mean) of the velocities of the probe cars 20 entering the section in that time period. For example, in the "section #1" of the time period "6:00", the average velocity of the probe cars 20 entering the section #1 between 6:00 and 6:15 is 30 km/h or more. In the "section #13" of the time period "7:30", the average velocity of the probe cars 20 entering the section #13 between 7:30 and 7:45 is 15.0 km/h to 19.9 km/h.

The required time acquisition unit 118 calculates the average velocity of the probe cars 20 in each section in each time period for the route R1. The required time acquisition unit 118 then calculates the average travel time (average required time) of the probe cars 20 in each section in each time period from the distance of and average velocity in each section. For example, if the average velocity of the "section #13" in the time period "7:30" is V1 [km/h] and the distance of the section #13 is L1 [km], the average travel time of the "section #13" in the time period "7:30" is L1/V1 [h].

Next, the required time acquisition unit 118 calculates the required time (travel time) for the route R1 in each time period by summing up the average travel times of the sections #1 to #13. As a result, a graph showing the actual value of the required time in each time period is obtained, as shown in the lower drawing in FIG. 8. In the lower drawing of FIG. 8, the solid line indicates an hourly transition of the actual value of the required time for the route R1. For example, the required time for the route R1 in the time period "6:00" is about 5.5 minutes. The required time for the route R1 in the time period "7:30" is about 11 minutes. The required time for the route R1 in the time period "9:45" is about 7 minutes. Therefore, since the required time for the route R1 in the time period "7:30" is longer than that in other time periods, it can be predicted that congestion may be occurring on the route R1 in the time period "7:30". Also, in the lower drawing of FIG. 8, the dashed line indicates the transition of a free flow travel time (required time in non-congestion) for the route R1 in each time. The method of calculating the free flow travel time will be described later.

The traffic volume calculation unit 120 calculates an inflow traffic volume on each route using the traffic volume data and the actual value of the required time (Step S110). The inflow traffic volume (generated traffic volume) on each route is the traffic volume (inflow traffic volume) entering the route from the reference point S for that route. That is, the traffic volume calculation unit 120 calculates the inflow traffic volume of vehicles entering the route from the reference point in each time (for each time period) using the traffic volume data and the actual value of the required time.

Figure 9:
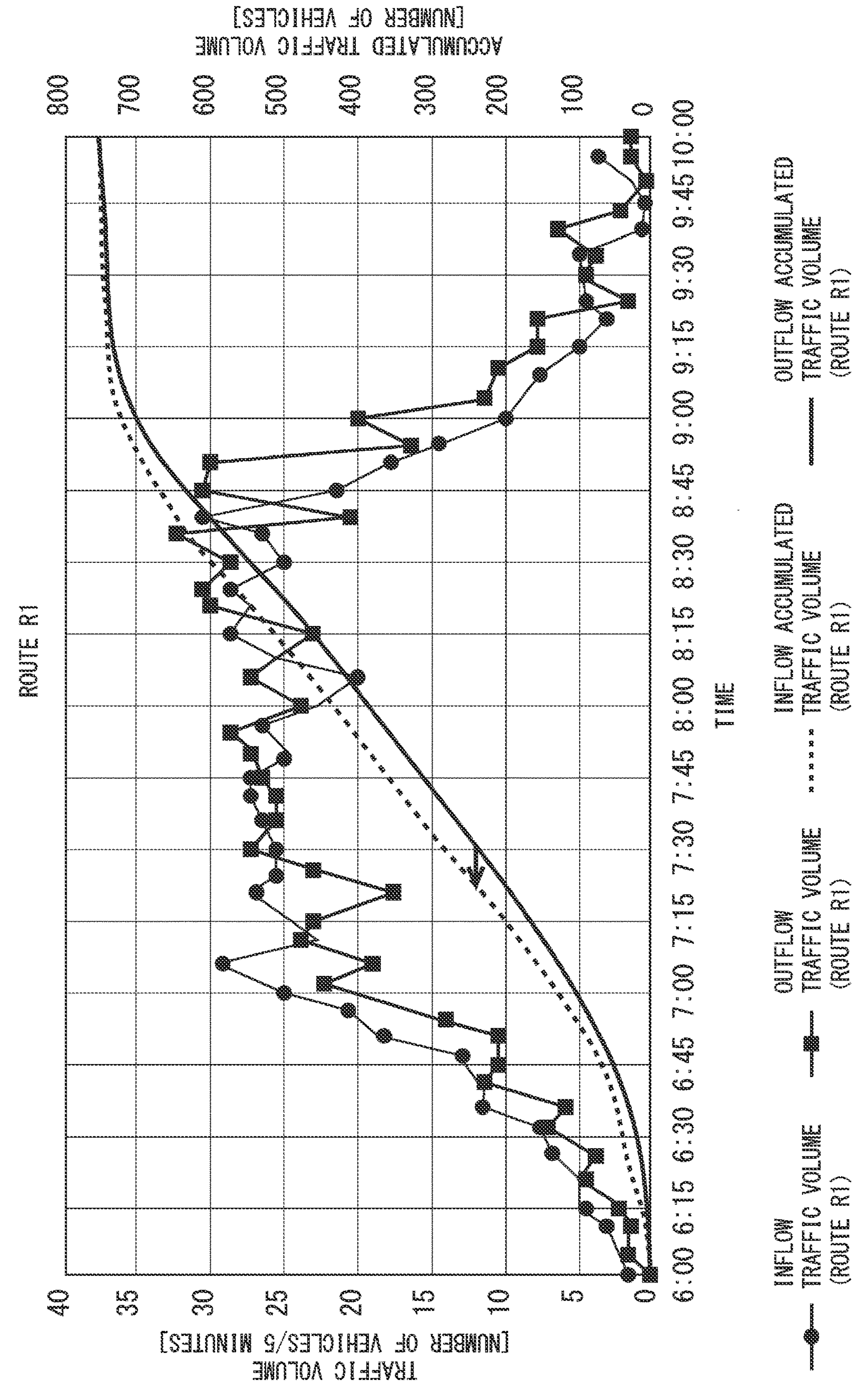
FIG. 9 is a diagram for explaining processing of a traffic volume calculation unit according to the first embodiment.

FIG. 4 is a flowchart showing processing of the traffic volume calculation unit 120 according to the first embodiment. FIG. 9 is a diagram for explaining the processing of the traffic volume calculation unit 120 according to the first embodiment. FIG. 9 is a graph showing the traffic volume on the route R1 in each time (for time period). In FIG. 9, the horizontal axis indicates the time, the vertical axis on the left indicates the traffic volume (traffic volume per unit time), and the vertical axis on the right indicates the accumulated traffic volume. The square dots in FIG. 9 indicate an hourly transition of the outflow traffic volume (traffic volume per unit time) on the route R1. The round dots in FIG. 9 indicate an hourly transition of the inflow traffic volume (traffic volume unit time) on the route R1. The solid line in FIG. 9 indicates the hourly transition of the outflow accumulated traffic volume (accumulated outflow traffic volume) on the route R1. The dashed line in FIG. 9 also indicates the hourly transition of the inflow accumulated traffic volume (accumulated inflow traffic volume) on the route R1.

The outflow traffic volume on the route R1 indicates the traffic volume of vehicles passing through the route R1 and outflowing from the predetermined point P (i.e., vehicles entering the parking lot from the predetermined point P). That is, the outflow traffic volume on the route R1 indicates the traffic volume of vehicles that outflow from the route R1. In other words, the outflow traffic volume on the route R1 indicates the traffic volume of vehicles that pass through the route R1 and enter the parking lot from the predetermined point P. The outflow accumulated traffic volume indicates the hourly accumulation of the outflow traffic volume. The inflow accumulated traffic volume indicates the hourly accumulation of the inflow traffic volume. The graph shown as an example in FIG. 9 can be obtained by the processing of the traffic volume calculation unit 120.

The outflow traffic volume calculation unit 122 calculates the outflow accumulated traffic volume on each route (Step S112). Specifically, the outflow traffic volume calculation unit 122 calculates the outflow accumulated traffic volume on each route using the route share ratio calculated in the processing of S106 and the traffic volume data. More specifically, for each route, the outflow traffic volume calculation unit 122 calculates the outflow traffic volume on each route by multiplying the traffic volume in the traffic volume data by the route share ratio for that route. For example, when the route share ratio for the route R1 is 70%, the outflow traffic volume on the route R1 is calculated by multiplying the traffic volume in FIG. 7 by 0.7. In this manner, the outflow traffic volumes as shown by the square dots in FIG. 9 are obtained.

The outflow traffic volume calculation unit 122 then calculates the outflow accumulated traffic volume on each route by accumulating the outflow traffic volume on each route. Thus, the outflow accumulated traffic volume as shown by the solid line in FIG. 9 is obtained. When the accumulated traffic volume (FIG. 7) of the traffic volume data of the predetermined point P is obtained, the outflow traffic volume calculation unit 122 may calculate the outflow accumulated traffic volume on each route by multiplying the accumulated traffic volume of the traffic volume data by the route share ratio of that route.

The inflow traffic volume calculation unit 124 calculates the inflow accumulated traffic volume on each route (Step S114). Specifically, for each route, the inflow traffic volume calculation unit 124 calculates the inflow accumulated traffic volume on the route using the outflow accumulated traffic volume on the route and the actual value of the required time. More specifically, for each time period, the inflow traffic volume calculation unit 124 moves the outflow accumulated traffic volume by the actual value of the required time corresponding to that time period in the past direction (left direction in FIG. 9) on the time axis. In this manner, the inflow traffic volume calculation unit 124 calculates the inflow accumulated traffic volume.

For example, in the example in FIG. 8, the position of the inflow accumulated traffic volume relative to the outflow accumulated traffic volume is moved to the left by approximately 5.5 minutes in the time period of "6:00", moved to the left by approximately 6 minutes in the time period of "6:15", and moved to the left by approximately 6.5 minutes in the time period of "6:30". Similarly, the position of the inflow accumulated traffic volume relative to the outflow accumulated traffic volume is moved to the left by approximately 7.5 minutes in the time periods of "6:45" to "7:00", and moved to the left by approximately 11 minutes in the time periods of "7:15" to "8:00". Similarly, the position of the inflow accumulated traffic volume relative to the outflow accumulated traffic volume is moved to the left by approximately 8.5 minutes in the time period of "8:15", and moved to the left by approximately 7 minutes in the time periods of "8:30" to "9:45".

The inflow traffic volume calculation unit 124 calculates the inflow traffic volume (traffic volume per unit time) on each route from the inflow accumulated traffic volume (Step S116). Specifically, the inflow traffic volume calculation unit 124 calculates the inflow traffic volume by replotting the inflow accumulated traffic volume to a value for each unit time (for example, every 5 minutes). In other words, the inflow traffic volume calculation unit 124 calculates the inflow traffic volume in each time (for each time period) by decomposing the inflow accumulated traffic volume into a value for each unit time. More specifically, the inflow traffic volume calculation unit 124 calculates the inflow traffic volume for each time period by calculating a difference between the value of the inflow accumulated traffic volume for a certain time period and the value of the inflow accumulated traffic volume of a time period preceding that time period.

The traffic model generation unit 130 generates a traffic model for each route (Step S120 in FIG. 3). The traffic model is generated by adjusting parameters of the traffic model so that when the inflow traffic volume calculated in the processing of S110 is input to the traffic model, the actual value of the required time acquired in the processing of S108 is reproduced. The traffic model can be generated for each route. The traffic model can be a model configured to output, when the inflow traffic volume of a corresponding route is input, a predicted value of an outflow traffic volume and a predicted value of a required time for that route. Furthermore, the traffic model can be a model that takes into account the queuing of vehicles at a bottleneck in the route.

The parameter setting unit 128 sets the parameters of the traffic model. The parameters of the traffic model are, for example, the free flow travel time and a bottleneck capacity. The parameter setting unit 128 sets the free flow travel time and bottleneck capacity. The bottleneck capacity will be described later. The free flow travel time and the bottleneck capacity are not constant on a time axis. That is, the free flow travel time can be different from time to time (from time period to time period). Similarly, the bottleneck capacity can be different from time to time (from time period to time period). The reasons why the free flow travel time and the bottleneck capacity are different from time to time (from time period to time period) include, for example, for each time period, different lighting intervals of traffic lights, varying number of vehicles turning right or left due to increase or decrease in the number of pedestrians, and varying proportions of large vehicles entering the route.

FIG. 8 is used to explain a method of setting the free flow travel time. The free flow travel time for a certain route is the required time (travel time) when there is no congestion on that route. For example, if the predetermined number of sections in which the average velocity is less than a predetermined velocity are consecutive, it may be determined that congestion is occurring on that route. In FIG. 8, in the time period of and after "8:00" (the time period enclosed by the alternate long and two short dashes line in the lower drawing), there are not more than three consecutive sections in which the velocity is less than 30 km/h. Therefore, it may be determined that there is no congestion in this time period. Therefore, the parameter setting unit 128 sets the free flow travel time in the time periods of and after "8:00" as the average (about 7 minutes) of the required time (travel time) in this time period in FIG. 8.

Also, in the time periods between "7:00" and "8:30" (the time period enclosed by the dashed line in the lower drawing), there are three or more consecutive sections where the velocity is less than 30 km/h. Therefore, it may be determined that a traffic congestion occurs in this time period. Thus, the parameter setting unit 128 sets, in FIG. 8, the free flow travel time in the time periods from "7:00" to "8:30" to the free flow travel time (about 7 minutes) in the time periods of and after "8:00" when no congestion is occurring. Also, in the time periods of and before "7:00" (the time period enclosed by a dash-dotted line in the lower drawing), the traffic volume is low at first, gradually approaches a critical state, and the free flow travel time is increased. Therefore, in FIG. 8, the parameter setting unit 128 sets the free flow travel time in the time periods of and before "7:00" as the average of the required time (travel time) in this time period.

Figure 10:
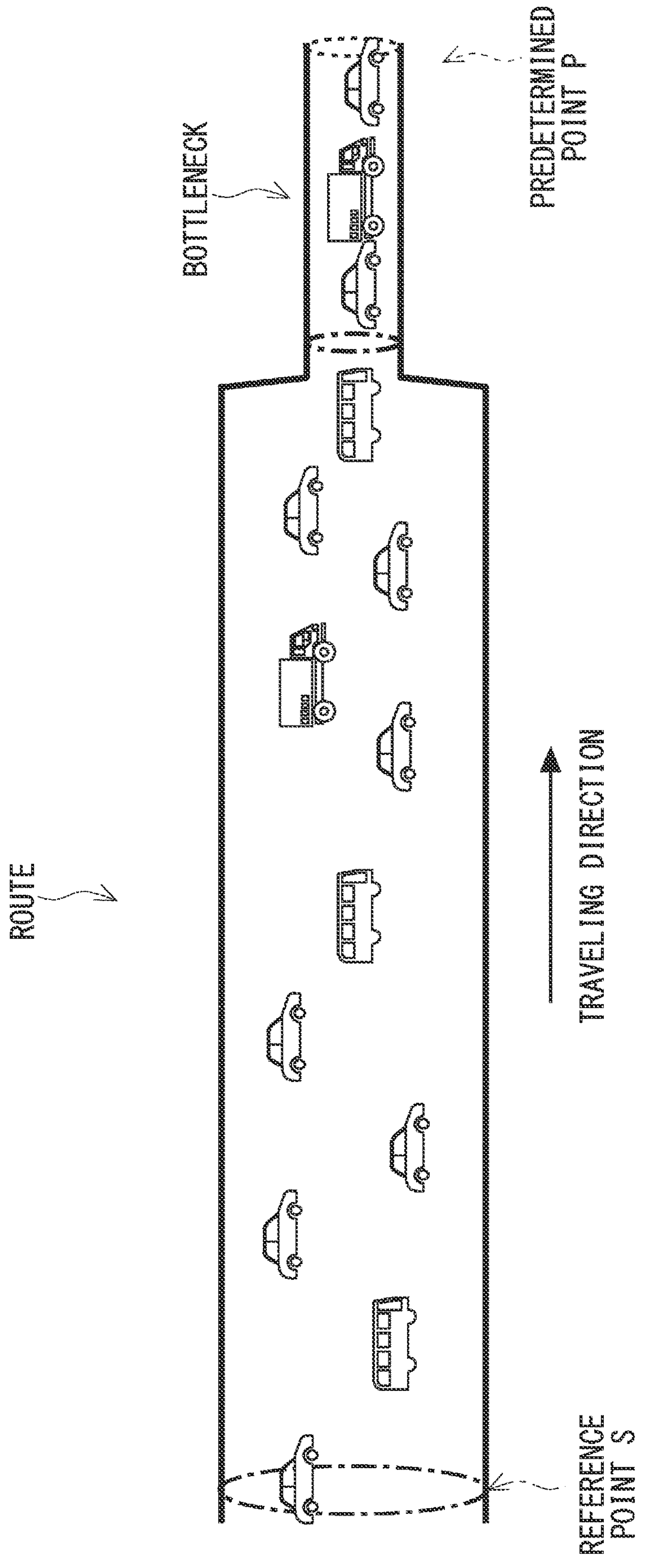
FIG. 10 is a diagram for explaining a bottleneck in a route of a traffic model according to the first embodiment.

FIG. 10 is a diagram for explaining a bottleneck in the route for the traffic model according to the first embodiment. Generally, in traffic, a bottleneck is a point that impedes a traffic flow. In other words, a bottleneck is a point where a traffic capacity is small. The bottleneck capacity is a traffic capacity at the bottleneck. For example, bottlenecks can occur at intersections, railroad crossings, merging/lane reduction points, curves, narrow streets, uphill slopes, roadworks/traffic control points, site entrances, parking lot entrances, and parking lots. The traffic capacity of a route is determined by a bottleneck with a relatively low capacity. That is, if the bottleneck capacity in the upstream of the route is smaller than that in the downstream of the route, congestion will occur at the bottleneck in the upstream of the route, while it is unlikely that congestion will occur at the bottleneck in the downstream of the route. Therefore, in the traffic model according to this embodiment, it is assumed that the bottleneck in the route is set at the most downstream position as shown in FIG. 10. Thus, in the traffic model, the distance between the bottleneck and the predetermined point P is ignored. Also, in the traffic model, it is assumed that the vehicle travels from the reference point S to just before the predetermined point P (bottleneck) in the free flow travel time, and holds up at the predetermined point P (bottleneck).

An example of the traffic model is shown below. Assume that $T_k(t)$ is a required time for a route k at each time t, and $d_k(t)$ is an outflow traffic volume. In this case, the required time $T_k(t)$ is expressed by Expression 1 below. In the following descriptions of mathematical expressions, mathematical expressions with a bar "–" above the letter X are sometimes described as "X‾" for convenience.

[Expression 1]

$$T_k(t) = \bar{T}_{k,t} + \frac{A_k(t - \bar{T}_{k,t}) - D_k(t)}{\bar{q}_{k,t}} \quad (1)$$

In this expression, $\bar{q}_{k,t}$ is a bottleneck capacity at the time t on the route k. As described above using FIG. 10, in the traffic model according to this embodiment, a bottleneck is set at the most downstream position (predetermined point P) of the route k.

$\bar{T}_{k,t}$ is the free flow travel time at the time t on the route k. $\bar{T}_{k,t}$ can be preset by the parameter setting unit 128 as described above. Further, $A_k(t)$ is the inflow accumulated traffic volume at the time t on the route k, as shown in Expression 2 below. Note that t' indicates the processing time of the timing before the time t. For example, when the required time $T_k(t)$ and the outflow traffic volume $d_k(t)$ are calculated at intervals of 5 minute, t'=t−5 [minutes].

[Expression 2]

$$A_k(t) = A_k(t') + \int_{t'}^{t} a_k(\tau)d\tau \quad (2)$$

In Expression 2, a boundary condition is set to $A_k(-\bar{T}_{k,0})=0$. In addition, $a_k(t)$ is the inflow traffic volume at the time t on the route k. This $a_k(t)$ corresponds to the inflow traffic volume calculated in the processing of S110 (S116). Thus, $a_k(t)$ is input to the traffic model.

Also, $D_k(t)$ is the outflow accumulated traffic volume at the time t on the route k, as shown in Expression 3 below.

[Expression 3]

$$D_k(t) = D_k(t') + \int_{t'}^{t} d_k(\tau)d\tau \quad (3)$$

In Expression 3, a boundary condition is $D_k(0)=0$. Also, $d_k(t)$ is the outflow traffic volume at the time t on the route k, as shown in Expression 4 below.

[Expression 4]

$$d_k(t) = \begin{cases} a_k(t - \bar{T}_{k,t}) & \ldots (A_k(t - \bar{T}_{k,t}) = D_k(t)) \\ \bar{q}_{k,T} & \ldots (A_k(t - \bar{T}_{k,t}) > D_k(t)) \end{cases} \quad (4)$$

Further, $a_k(t-\bar{T}_{k,t})$ indicates the traffic volume of vehicles flowing into the route k from the reference point S at the time that is the free flow travel time $\bar{T}_{k,t}$ before the time t. In this traffic model, it is assumed that vehicles travel from the reference point S to the predetermined point P (bottleneck) in the free flow travel time. Therefore, $a_k(t-\bar{T}_{k,t})$ corresponds to the traffic volume of vehicles arriving at the bottleneck (predetermined point P) at the time t. Similarly, $A_k(t-\bar{T}_{k,t})$ indicates the accumulated traffic volume of vehicles flowing into the route k from the reference point S at the time that is the free flow travel time $\bar{T}_{k,t}$ before the time t. $A_k(t-\bar{T}_{k,t})$ corresponds to the accumulated traffic volume of vehicles arriving at the bottleneck (predetermined point P) at the time t.

In the upper part of the right side of Expression 4, if $A_k(t-\bar{T}_{k,t})=D_k(t)$, then $d_k(t)=a_k(t-\bar{T}_{k,t})$. If $A_k(t-\bar{T}_{k,t})=D_k(t)$, then there is no holdup (queue) at the bottleneck (predetermined point P). Therefore, the inflow traffic volume $a_k(t-\bar{T}_{k,t})$ of all vehicles entering the route k at the time $(t-\bar{T}_{k,t})$ outflow from the route k at the time t. Therefore, $d_k(t)=a_k(t-\bar{T}_{k,t})$. In this case, the inflow traffic volume $a_k(t-\bar{T}_{k,t})$ of vehicles flowing into the route k at the time $(t-\bar{T}_{k,t})$ does not exceed the bottleneck capacity $\bar{q}_{k,t}$ at the time t. Therefore, the inflow traffic volume $a_k(t-\bar{T}_{k,t})$ of all vehicles outflow from the route k at the time t.

The lower part of Expression 4 indicates that if $A_k(t-\bar{T}_{k,t})>D_k(t)$, then $d_k(t)=\bar{q}_{k,t}$. If $A_k(t-\bar{T}_{k,t})>D_k(t)$, then there is holdup (queue) occurring at the bottleneck (predetermined point P). Therefore, not all of the vehicles indicated by the inflow traffic volume $a_k(t-\bar{T}_{k,t})$ that have flown into the route k at the time $(t-\bar{T}_{k,t})$ outflow from the route k at the time t, but some of the vehicles (or all of the vehicles if there is a large queue already holding up) hold up at the bottleneck. Then, if the traffic volume corresponding to the holdup queue exceeds the bottleneck capacity $\bar{q}_{k,t}$, the outflow traffic volume $d_k(t)$ will become the bottleneck capacity $\bar{q}_{k,t}$.

In Expression 1 above, "$A_k(t-\bar{T}_{k,t})-D_k(t)$" means the volume of the queue (number of vehicles). Therefore, the second term on the right side of Expression 1 means the time (holdup time) due to holding up in the queue. Therefore, Expression 1 means that the required time $T_k(t)$ for the route k at the time t is a sum of the free flow travel time $\bar{T}_{k,t}$ and the holdup time.

For each route, the traffic model generation unit 130 inputs the inflow traffic volume calculated in the processing of S110 to the traffic model represented by Expressions 1 to 4 described above. Next, the traffic model generation unit 130 calculates the predicted value $T_k(t)$ of the required time at each time t (each time period) as represented by Expression 1 by performing the calculations of Expressions 1 to 4 in order from t=0. Next, the traffic model generation unit 130 performs curve fitting between the calculated predicted value $T_k(t)$ of the required time and the actual value of the required time (lower drawing of FIG. 8). Next, the bottleneck capacity $\bar{q}_{k,t}$ (bottleneck capacity parameter) is adjusted so that the predicted value $T_k(t)$ of the required time is fitted to the actual value of the required time. For example, if the predicted value $T_k(t)$ of the required time deviates significantly from the actual value of the required time at a certain time t, the bottleneck capacity $\bar{q}_{k,t}$ corresponding to that time t may be adjusted.

Figure 11:
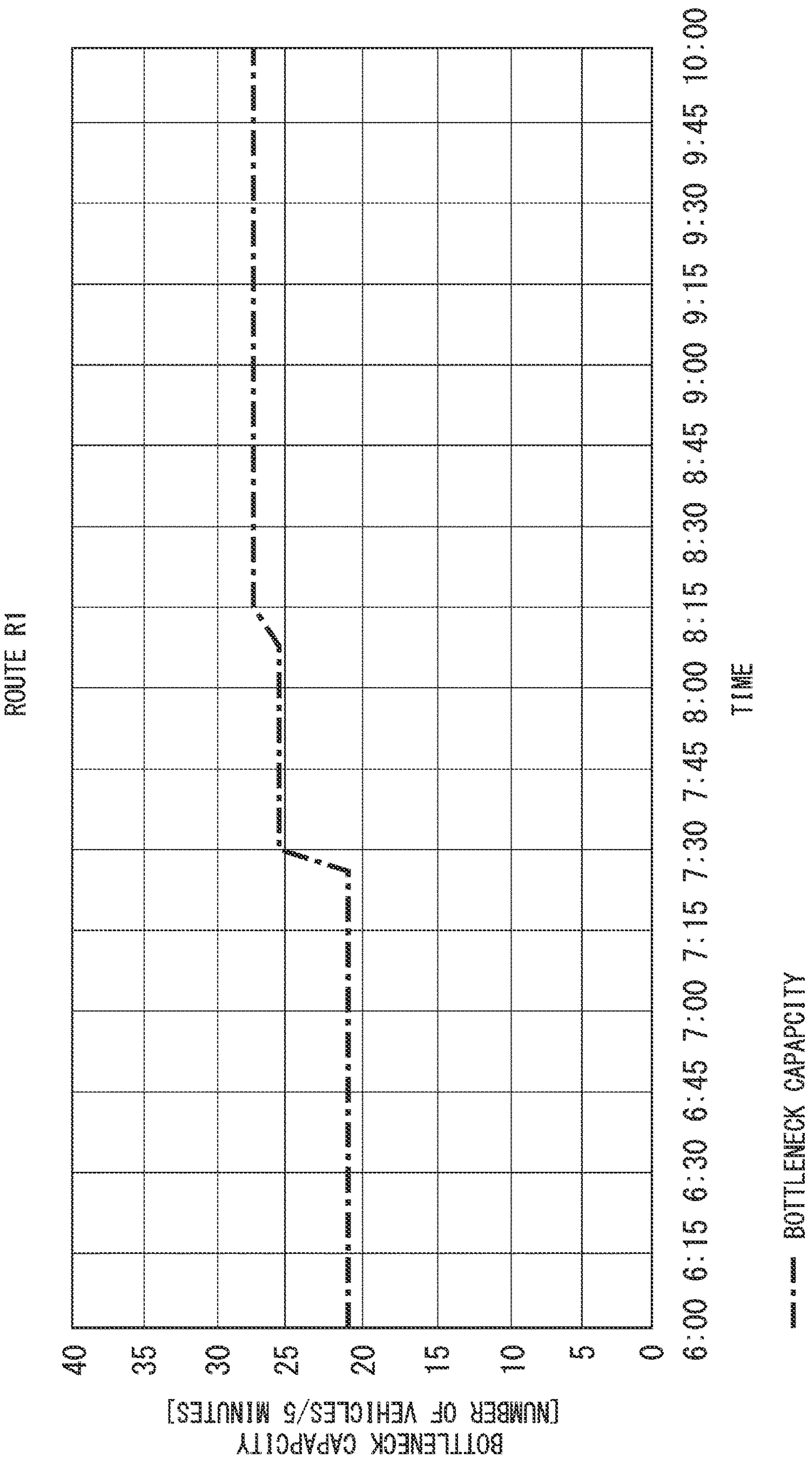
FIG. 11 shows an example of a bottleneck capacity adjusted during generation of the traffic model according to the first embodiment.
Figure 12:
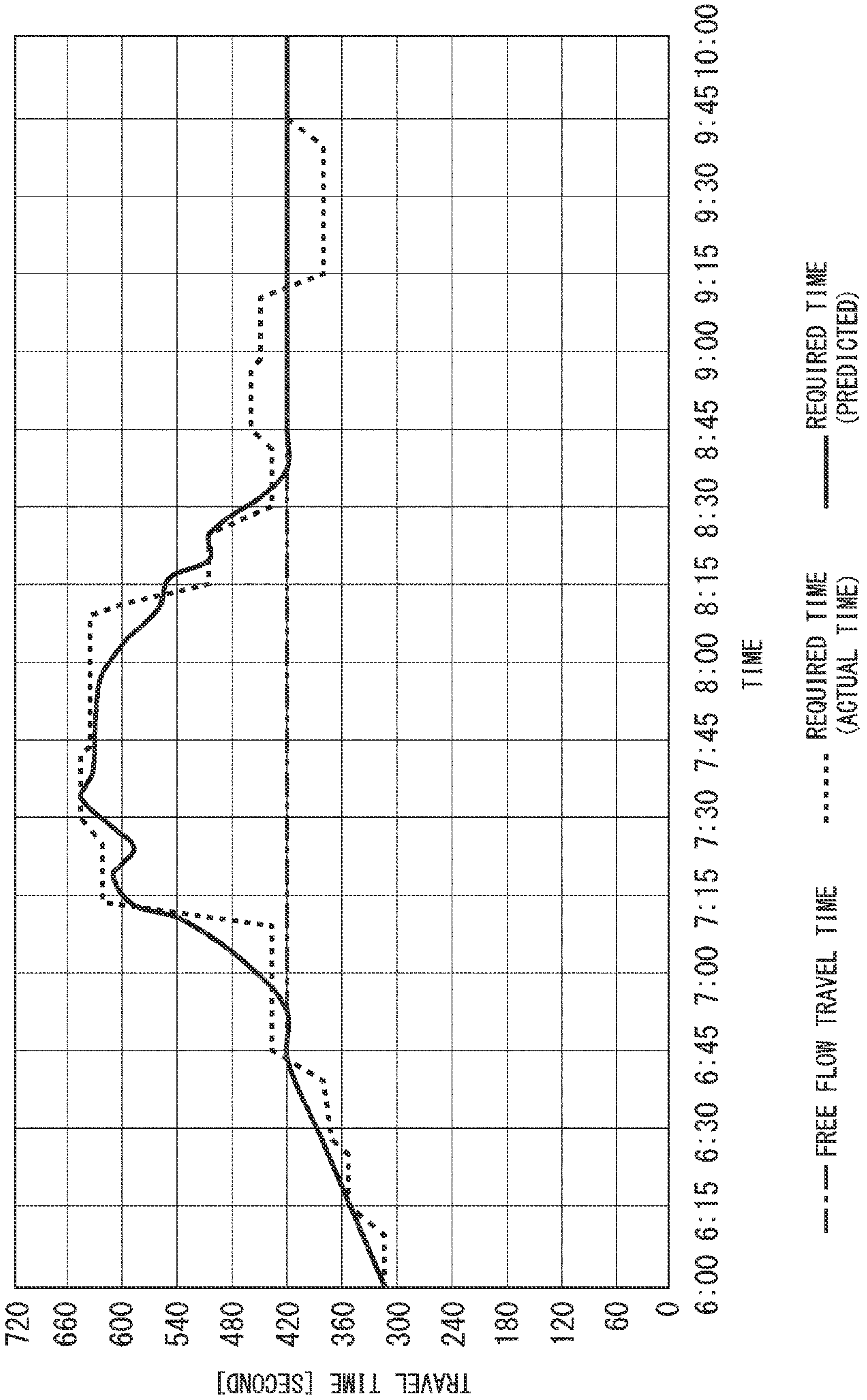
FIG. 12 shows an example of predicted values of the required time calculated by the traffic model according to the first embodiment.

FIG. 11 shows an example of the adjusted bottleneck capacity during the generation of the traffic model according to the first embodiment. FIG. 12 shows an example of the predicted value of the required time calculated by the traffic model according to the first embodiment. FIGS. 11 and 12 show the bottleneck capacity and required time for the route R1, respectively. In FIG. 11, the horizontal axis indicates the time, and the vertical axis indicates the value of the bottleneck capacity. The dash-dotted line in FIG. 11 also indicates the transition of the bottleneck capacity over time. In FIG. 12, the horizontal axis indicates the time, and the vertical axis indicates the required time (travel time). In FIG. 12, the solid line indicates the hourly transition of the predicted value of the required time, and the dashed line indicates the hourly transition of the actual value of the required time. The dash-dotted line indicates the hourly transition of the free flow travel time.

For example, the traffic model described in FIG. 12 may use the bottleneck capacity shown as an example in FIG. 11 as a parameter. As shown as an example in FIG. 12, the predicted value of the required time calculated by the traffic model generated by the traffic model generation unit 130 mostly satisfactorily reproduces the actual value of the required time. As shown as an example in FIG. 11, the bottleneck capacity is not constant for all times, but a value of the bottleneck capacity differs each time. That is, the bottleneck capacity is a parameter in each time for each route. In this way, the bottleneck capacity is configured to be different from time to time, so that the traffic model can be used to calculate the predicted value of the required time that satisfactorily reproduces the actual value of the required time. Therefore, in this embodiment, the required time $T_k(t)$ and the outflow traffic volume $d_k(t)$ on the route k can be accurately predicted using the traffic model defined by the above expressions.

Furthermore, in this embodiment, since the required time $T_k(t)$ for the route k can be accurately predicted using the traffic model, it is possible to accurately calculate the predicted value of the required time when the inflow traffic volume is changed. Therefore, in this embodiment, it is possible to accurately calculate an amount of change in the predicted value of the required time when the inflow traffic volume is changed. Details thereof are described below.

FIG. 5 is a flowchart that uses the traffic model according to the first embodiment to calculate the amount of change in the predicted value of the required time when the inflow traffic volume is changed. Here, "changing the inflow traffic volume" is performed to evaluate implementation of a measure to reduce congestion (behavior modification). In other words, the traffic prediction apparatus 100 calculates the amount of change in the required time when the measures are implemented using the inflow traffic volume taking into account the amount of change in the inflow traffic volume when the measures are implemented.

Since processing of Steps S132 to S140 is substantially similar to the processing of S102 to S110 in FIG. 3, respectively, descriptions thereof are omitted. If the inflow traffic volume on each route generated in the processing for generating a traffic model (FIG. 3) is also used in the processing of FIG. 5, the processing of S132 to S140 may be omitted.

The amount of change setting unit 140 sets an amount of change in the inflow traffic volume (Step S142). Specifically, the amount of change setting unit 140 sets an amount of change in the inflow traffic volume corresponding to the assumed measure. An example of the measure is to convert X % of employee vehicles (target vehicles) passing through an evaluation target route to bus commuting, such as shuttle buses (transportation conversion). Another example of the measure is to convert X % of employee vehicles (target vehicles) passing through during the time periods when the traffic volume is high (peak time periods) to off-peak time period (off-peak commuting). For example, in the case of the measure of "converting 30% of employee vehicles to bus commuting", the amount of change setting unit 140 may reduce the inflow traffic volume by 30% over the entire time periods. That is, the amount of change setting unit 140 multiplies the inflow traffic volume by 0.7 over the entire time periods. For example, in the case of the measure of "converting 30% of employee vehicles to bus commuting", the amount of change setting unit 140 may reduce the inflow traffic volume by 30% during the congested time period (described later). For example, in the case of the measure of "converting 30% of employee vehicles passing through during the peak time period to the off-peak time period", the amount of change setting unit 140 may move 30% of the inflow traffic volume during the peak time period to the off-peak time period.

The traffic state prediction unit 150 calculates the predicted value of the required time (Step S150). That is, for each route, the traffic state prediction unit 150 calculates the predicted value of the required time for the inflow traffic volume calculated in S140 and the predicted value of the required time when the inflow traffic volume is changed using the traffic model generated in advance in S120. Specifically, the parameters (free flow travel time and bottleneck capacity) of the traffic model are determined in the processing of S120. Next, the traffic state prediction unit 150 inputs the inflow traffic volume for each time period calculated in the processing of S140 to the traffic model whose parameters are determined to calculate the predicted value of the required time for each time period before the implementation of the measures. Similarly, the traffic state prediction unit 150 inputs the inflow traffic volume for each time period calculated by adding the amount of change set in the processing of S142 to the traffic model whose parameters are determined to thereby calculate the predicted value of the required time for each time period when the inflow traffic volume is changed (that is, when the measures are implemented).

The amount of change calculation unit 160 calculates the amount of change in the required time (Step S160). That is, for each route, the amount of change calculation unit 160 calculates the amount of change in the predicted value of the required time when the inflow traffic volume is changed. Specifically, the amount of change calculation unit 160 calculates a difference between the predicted value of the required time for the inflow traffic volume before the change (before the implementation of the measures) and the predicted value of the required time when the inflow traffic volume is changed (when the measures are implemented). For example, the amount of change (difference) may be a difference between a peak of the predicted value of the required time before the implementation of the measures and a peak of the predicted value of the required time when the measures are implemented. Alternatively, for example, the amount of change (difference) may be a difference between an average of the predicted value of the required time before the implementation of the measures and an average of the predicted value of the required time when the measures are implemented. Further alternatively, for example, the amount of change (difference) may be a difference between a length of the congested time period in the predicted value of the required time before the implementation of the measures and a length of the congested time period in the predicted value of the required time when the measures are implemented. The congested time period may be the time period where the predicted value of the required time exceeds the free flow travel time.

In another alternative, the amount of change (difference) may be a difference between an area of a region defined by the curve of the predicted value of the required time before the implementation of the measures and an area of a region defined by the curve of the predicted value of the required time when the measures are implemented. Here, "the area of the region defined by the curve of the predicted value of the required time" may be a value obtained by integrating the predicted value of the required time in the entire time periods (which is the area between the curve of the predicted value of the required time and the horizontal axis). Alternatively, "the area of the region defined by the curve of the predicted value of the required time" may be an area between the curve of the predicted value of the required time and the curve of the free flow travel time.

If the traffic prediction apparatus 100 has not completed the processing of S142 to S160 for all measures (NO in Step S170), the processing returns to S142. The traffic prediction apparatus 100 performs the processing of S142 to S160 for the other measures for which the processing has not been completed. On the other hand, when the traffic prediction apparatus 100 completes the processing of S142 to S160 for all measures (YES in S170), the processing ends.

FIGS. 13 to 16 show a comparison between the predicted values of the required times before the implementation of the measures and the predicted values of the required times when the measures are implemented according to the first embodiment. In each of FIGS. 13 to 16, the dashed line indicates the hourly transition of the predicted values of the required times when no measure is implemented (when the conversion rate is 0%). The solid line indicates the hourly transition of the predicted value of the required time when the measures are implemented. The dash-dotted line indicates the hourly transition of the free flow travel time. The horizontal axis indicates the time, and the vertical axis on the left indicates the travel time (required time) in [seconds].

Figure 13:
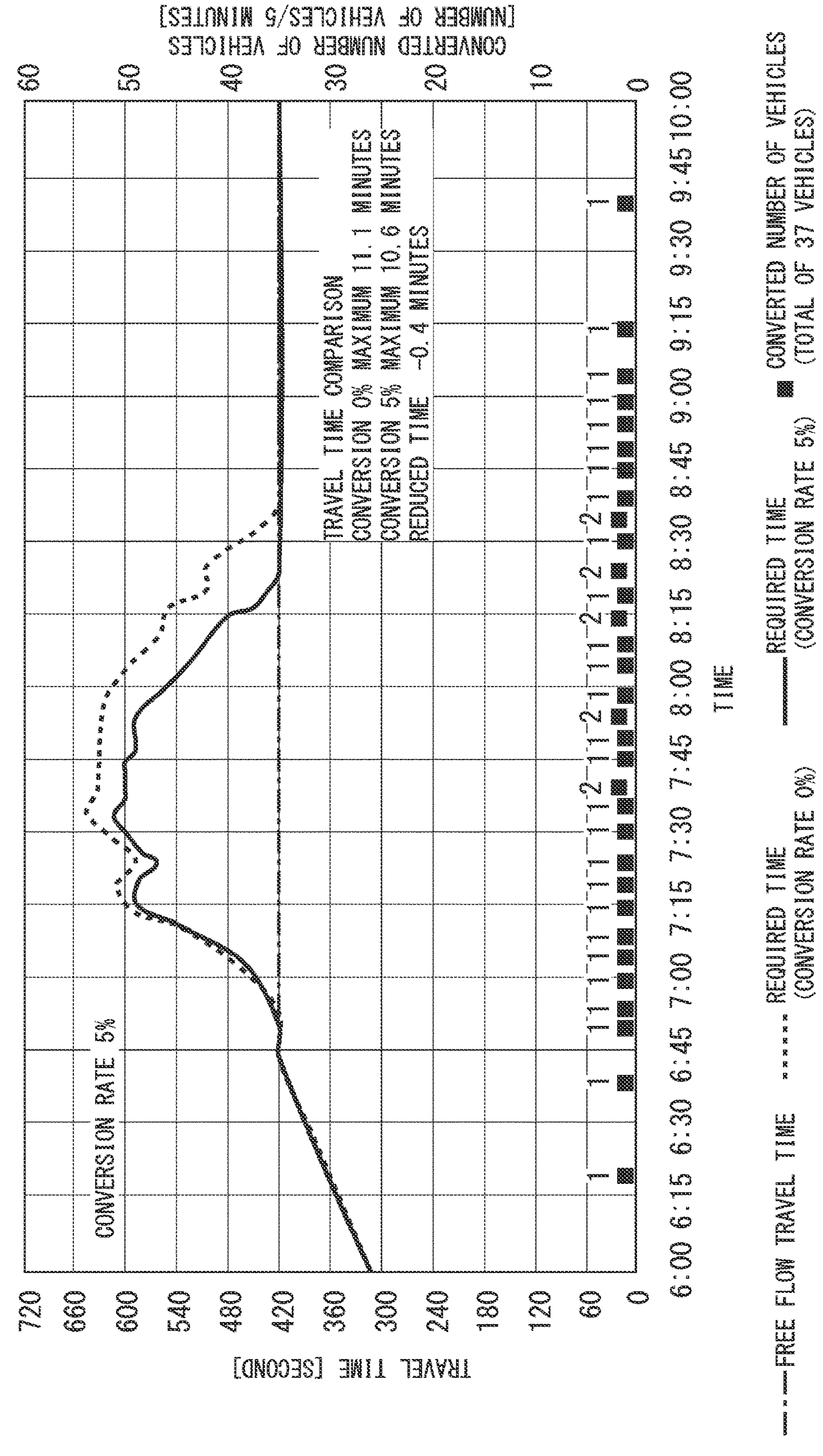
FIG. 13 shows a comparison between predicted values of a required time before implementation of measures and predicted values of a required time when the measures are implemented according to the first embodiment.
Figure 14:
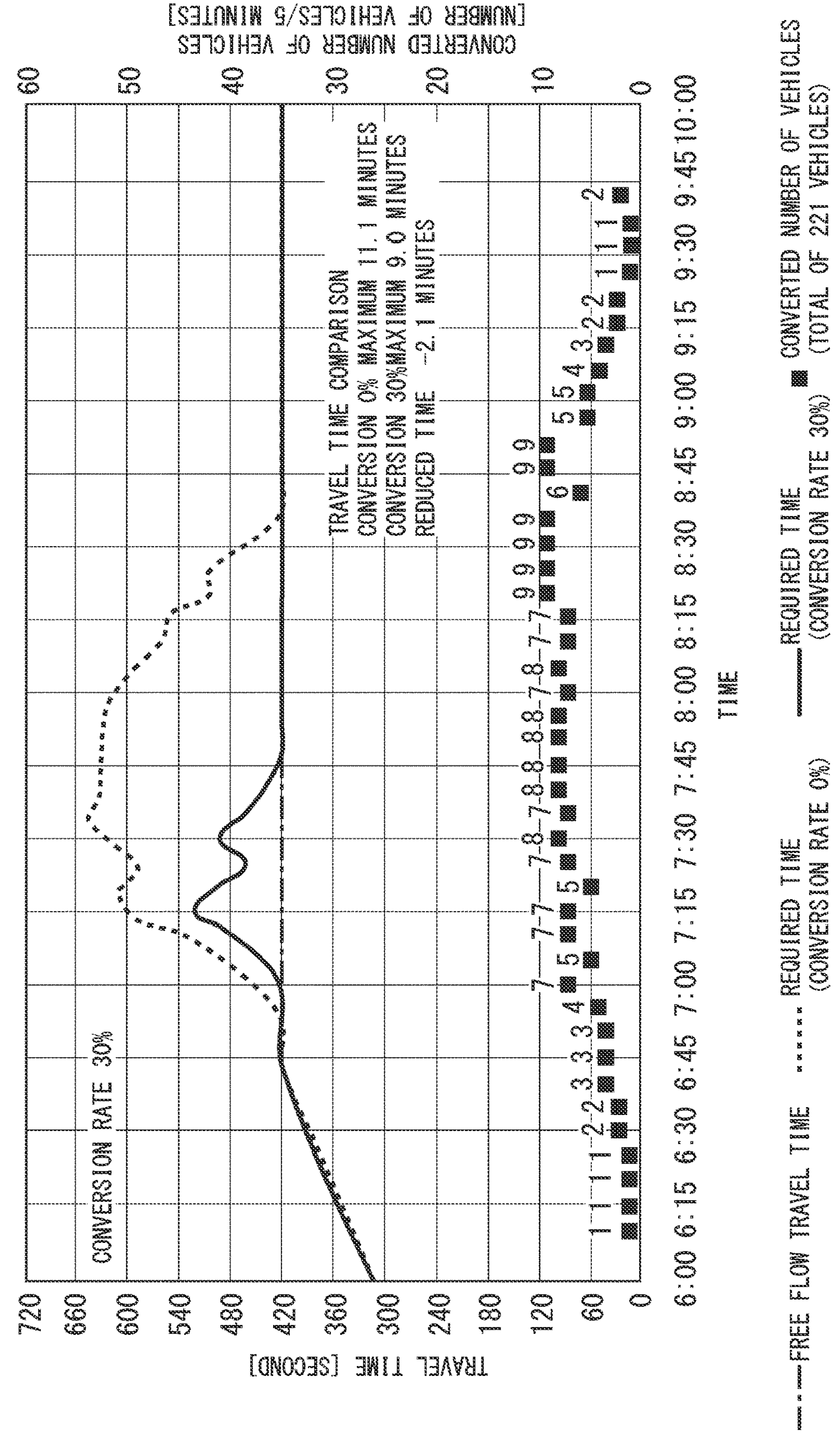
FIG. 14 shows a comparison between predicted values of a required time before implementation of measures and predicted values of a required time when the measures are implemented according to the first embodiment.

FIGS. 13 to 14 show the predicted required time when the measure of "transportation means conversion" is implemented for the route R1. In FIGS. 13 to 14, the square dots indicate the hourly transition of the number of vehicles converted from private car commuting to bus commuting at each time, and the vertical axis on the right shows the number of vehicles converted. FIG. 13 shows a comparison between the required times when the measure of "converting 5% of employee vehicles to bus commuting" is implemented and the required time before the measures are implemented. FIG. 14 shows a comparison between the required times when the measure of "converting 30% of employee vehicles to bus commuting" is implemented and the required time before the measures are implemented. As shown as an example in FIG. 13, at a conversion rate of 5%, the change in the required time (travel time) during the peak time periods is −0.4 minutes. On the other hand, as shown in an example in FIG. 14, at a conversion rate of 30%, the change in the required time (travel time) during the peak time periods is −2.1 minutes. Therefore, the administrator can effectively evaluate the measure of "converting 5% of employee vehicles to bus commuting" and "converting 30% of employee vehicles to bus commuting".

Figure 15:
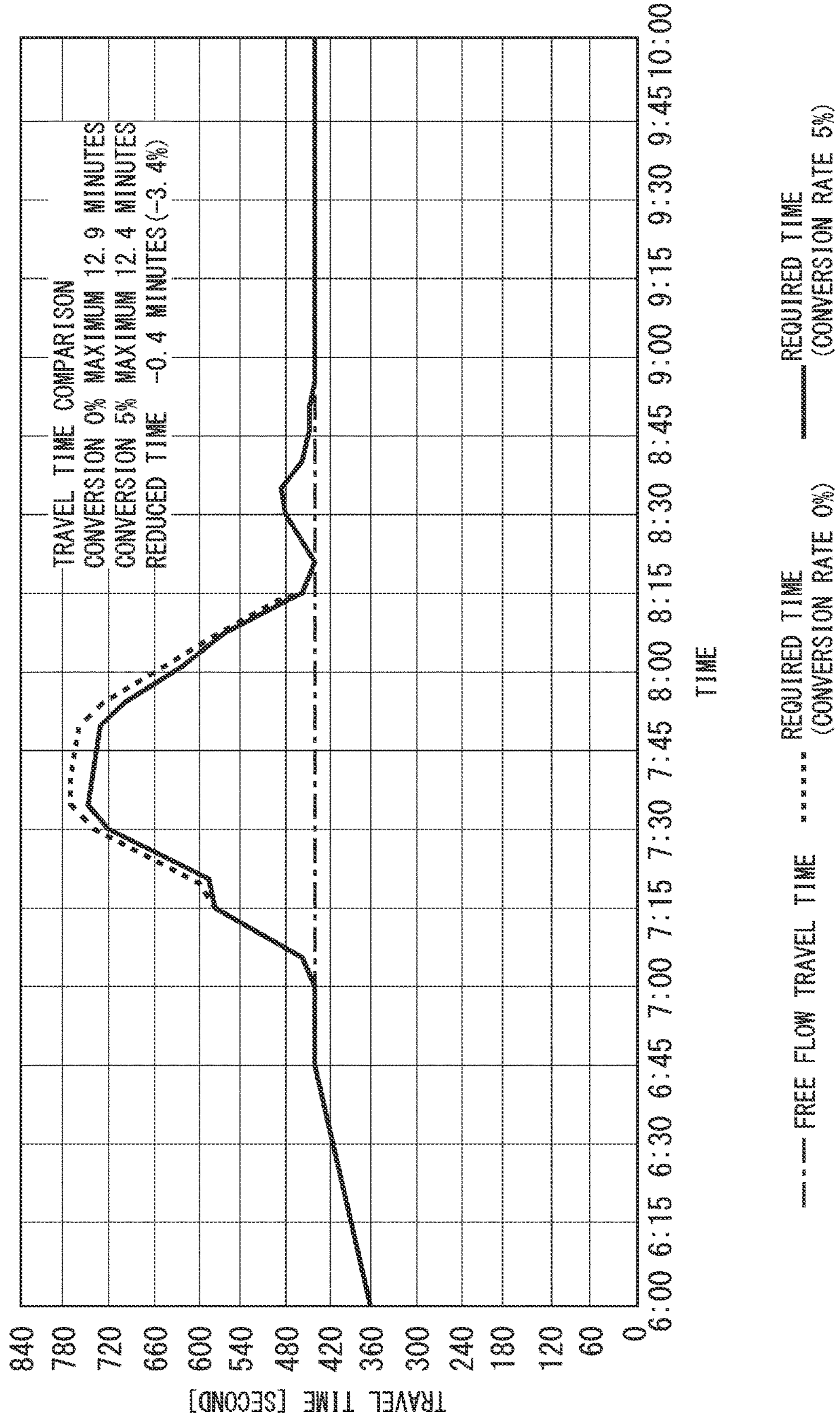
FIG. 15 shows a comparison between predicted values of a required time before implementation of measures and predicted values of a required time when the measures are implemented according to the first embodiment.
Figure 16:
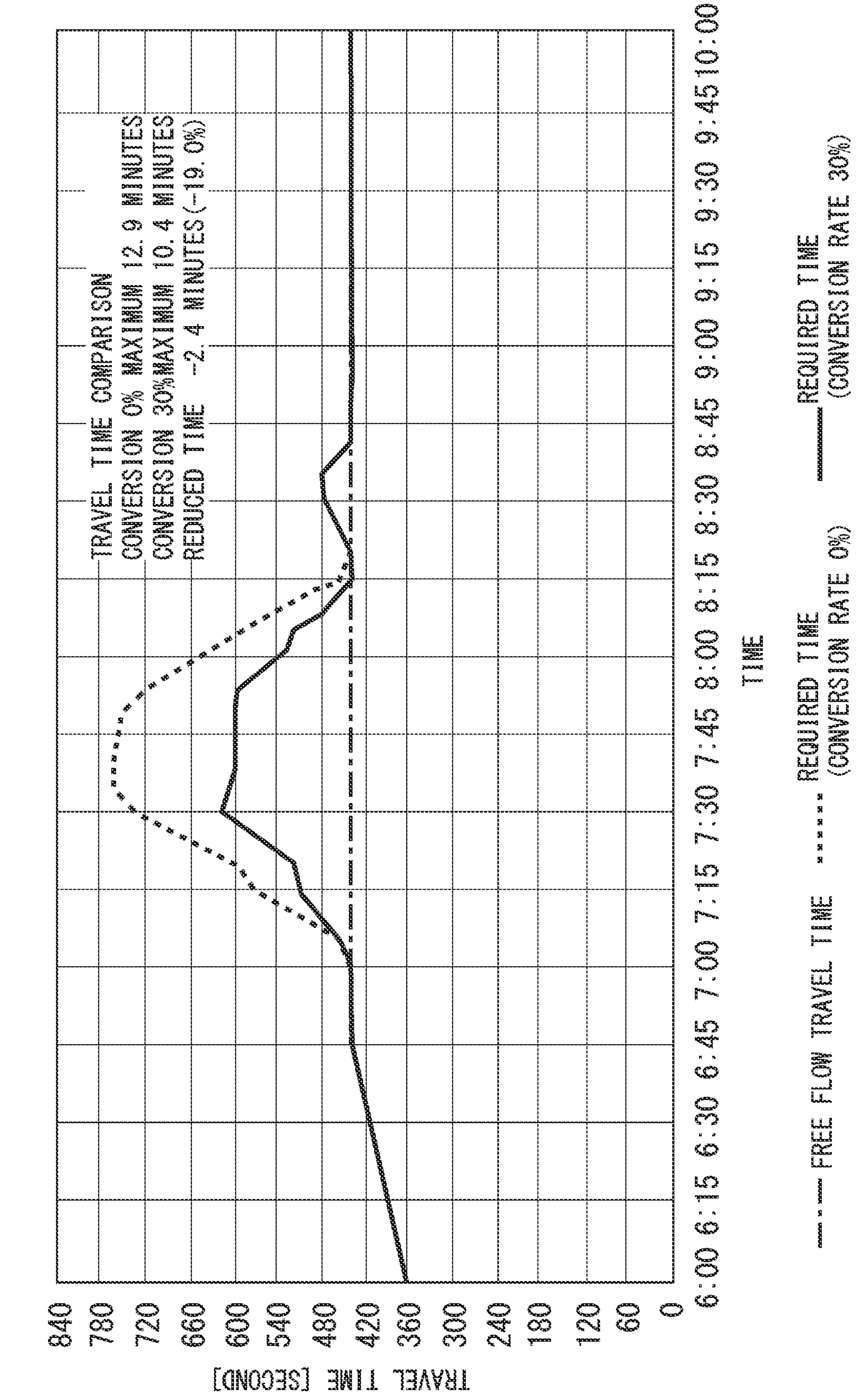
FIG. 16 shows a comparison between predicted values of a required time before implementation of measures and predicted values of a required time when the measures are implemented according to the first embodiment.

FIGS. 15 to 16 show the predicted required time when the measure of "off-peak commuting" is implemented for the route R1. FIG. 15 shows a comparison between the required time when the measure of "converting 5% of employee vehicles passing through during the peak time period to the off-peak time period" is implemented and the required time before the measures are implemented. FIG. 16 shows a comparison between the required time when the measure of "converting 30% of employee vehicles passing through during the peak time period to the off-peak time period" is implemented and the required time before the measures are implemented. In the examples in FIGS. 15 and 16, the peak time periods are set to 1 hour from 6:40 to 7:40. The employee vehicles corresponding to the first half of the peak time periods (6:40 to 7:10) are configured to depart 15 minutes earlier and those corresponding to the second half of the peak time periods (7:10 to 7:40) are configured to depart 15 minutes later.

As shown as an example in FIG. 15, at a conversion rate of 5%, the change in the required time (travel time) during the peak time periods is −0.4 minutes. On the other hand, as shown as an example in FIG. 16, at a conversion rate of 30%, the change in the required time (travel time) during the peak time periods is −2.4 minutes. Therefore, the administrator can effectively evaluate the measures of "converting 5% of employee vehicles passing through during the peak time period to the off-peak time period" and "converting 30% of employee vehicles passing through during the peak time period to the off-peak time period".

When the administrator (system administrator) of a facility corresponding to the predetermined point P predicts the traffic of a target vehicle for that facility, he/she may want to predict how much congestion will be reduced and how much required time will be shortened by the behavior modification of the target vehicle. The traffic volume data is required to predict the traffic state, but it is generally difficult to obtain infrastructure data such as traffic counter information.

The traffic prediction system 1 according to this embodiment is configured to calculate the inflow traffic volume on each route from the traffic volume data at the predetermined point P and the actual value of the required time. In addition, the traffic prediction system 1 according to this embodiment is configured to calculate the predicted value of the required time for the calculated inflow traffic volume and the predicted value of the required time when the inflow traffic volume is changed using the traffic model generated in advance. The traffic prediction system 1 according to this embodiment is configured to calculate, for each route, the amount of change in the predicted value of the required time when the inflow traffic volume is changed. With such a configuration, the change in the required time when the inflow traffic volume is changed can be predicted without acquiring the infrastructure data. Therefore, the traffic prediction system 1 according to this embodiment can efficiently predict the change in the travel time required to pass through the route when the traffic volume on the route changes as a behavior is modified.

Moreover, the traffic prediction system 1 according to this embodiment is configured to acquire the actual value of the required time using the probe data (travel performance data) obtained from each of the plurality of probe cars passing through the route. The probe data is obtained from each of the probe cars 20 that can be managed by the system administrator. Therefore, it is easy for the system administrator to acquire the probe data. Thus, the traffic prediction system 1 according to this embodiment can easily acquire the actual value of the required time.

In addition, the traffic prediction system 1 according to this embodiment is configured to, for each of the plurality of routes, acquire the actual value of the required time, calculate the inflow traffic volume, and calculate the predicted value of the required time and the predicted value of the required time when the inflow traffic volume is changed. The traffic prediction system 1 according to this embodiment is further configured to calculate the amount of change in the predicted value of the required time when the inflow traffic volume is changed for each of the plurality of routes. With such a configuration, it is possible to predict which route has a large amount of change in the required time. Therefore, it is possible to determine which route is most effective for behavior modification. This makes it possible to actively implement the measures of behavior modification for the route that is most effective for the behavior modification.

In addition, the traffic prediction system 1 according to this embodiment is configured to calculate the inflow traffic volume for each of the plurality of routes by using the share ratio of each route for the traffic volume in the traffic volume data, which the share ratio is calculated based on the number of probe cars passing through each of the plurality of routes. This configuration makes it possible to calculate the inflow traffic volume on each route without acquiring the infrastructure data such as traffic counter information.

In addition, the traffic prediction system 1 according to this embodiment is configured to calculate the outflow accumulated traffic volume for each of the plurality of routes using the share ratio, to calculate the inflow accumulated traffic volume using the outflow accumulated traffic volume and the actual value of the required time, and to calculate the inflow traffic volume from the inflow accumulated traffic volume. This configuration makes it possible to calculate the inflow traffic volume on each route without acquiring the infrastructure data such as the traffic counter information.

In the traffic prediction system 1 according to this embodiment, the traffic model is configured to be generated by adjusting the parameters of the traffic model so as to reproduce the actual value of the required time when the inflow traffic volume is input to the traffic model. With such a configuration, it is possible to accurately calculate the predicted value of the required time from the inflow traffic volume.

In the traffic prediction system 1 according to this embodiment, the parameters of the traffic model are configured to include the bottleneck capacity in each time for the route. With such a configuration, it is possible to calculate the predicted value of the required time that satisfactorily reproduces the actual value of the required time. Therefore, in this embodiment, it is possible to accurately predict the required time and the outflow traffic volume.

Second Embodiment

Next, a second embodiment will be described with reference to the drawings. For clarity of explanation, the following descriptions and drawings have been omitted and simplified as appropriate. Also, in each drawing, the same elements are given the same signs, and repeated descriptions have been omitted as necessary. It should be noted that the system configuration according to the second embodiment is substantially similar to that shown in FIG. 1, so a description thereof is omitted. The second embodiment differs from the first embodiment in that the infrastructure data can be acquired in the second embodiment.

Figure 17:
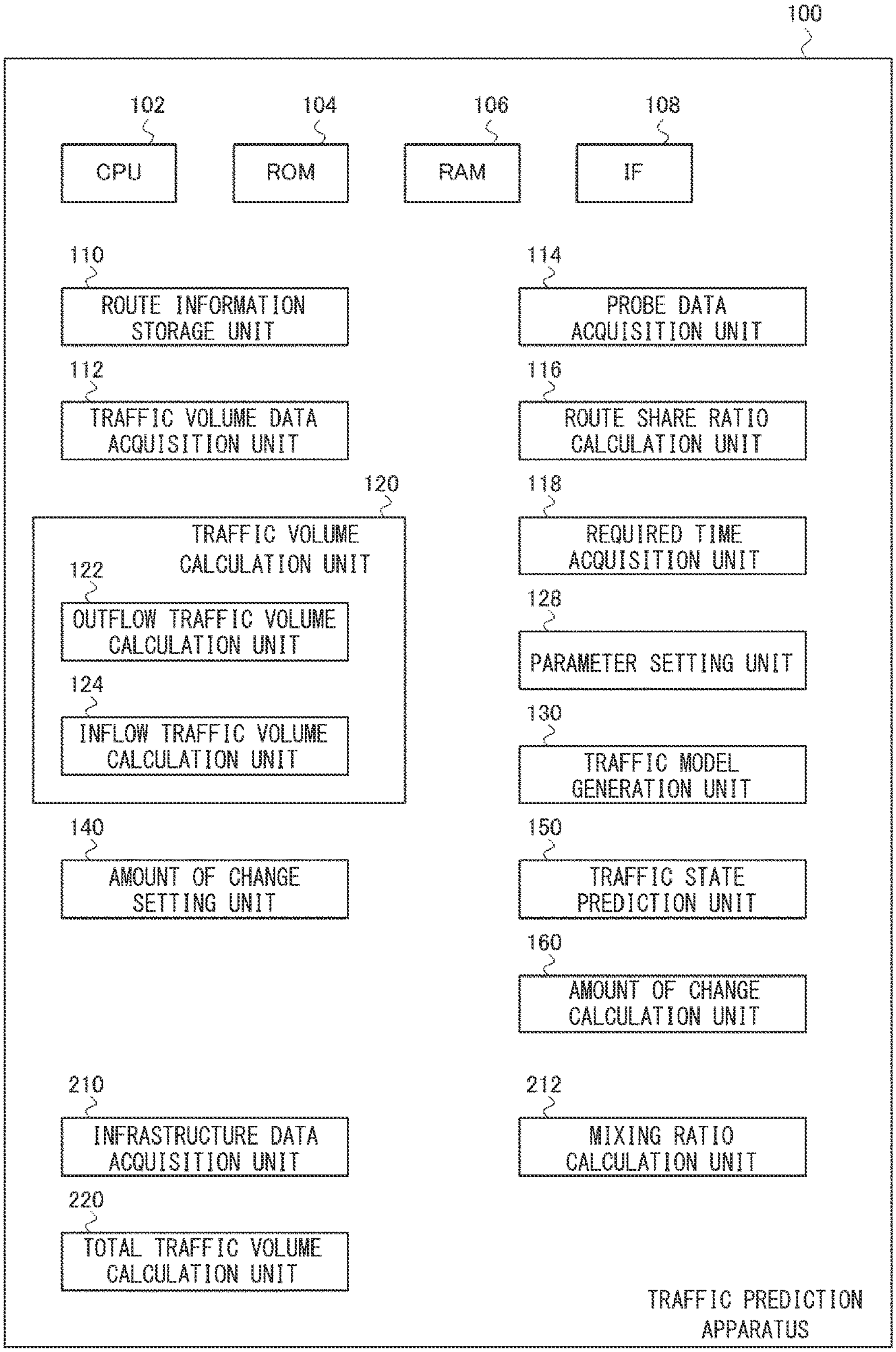
FIG. 17 shows a configuration of a traffic prediction apparatus according to a second embodiment.
Figure 18:
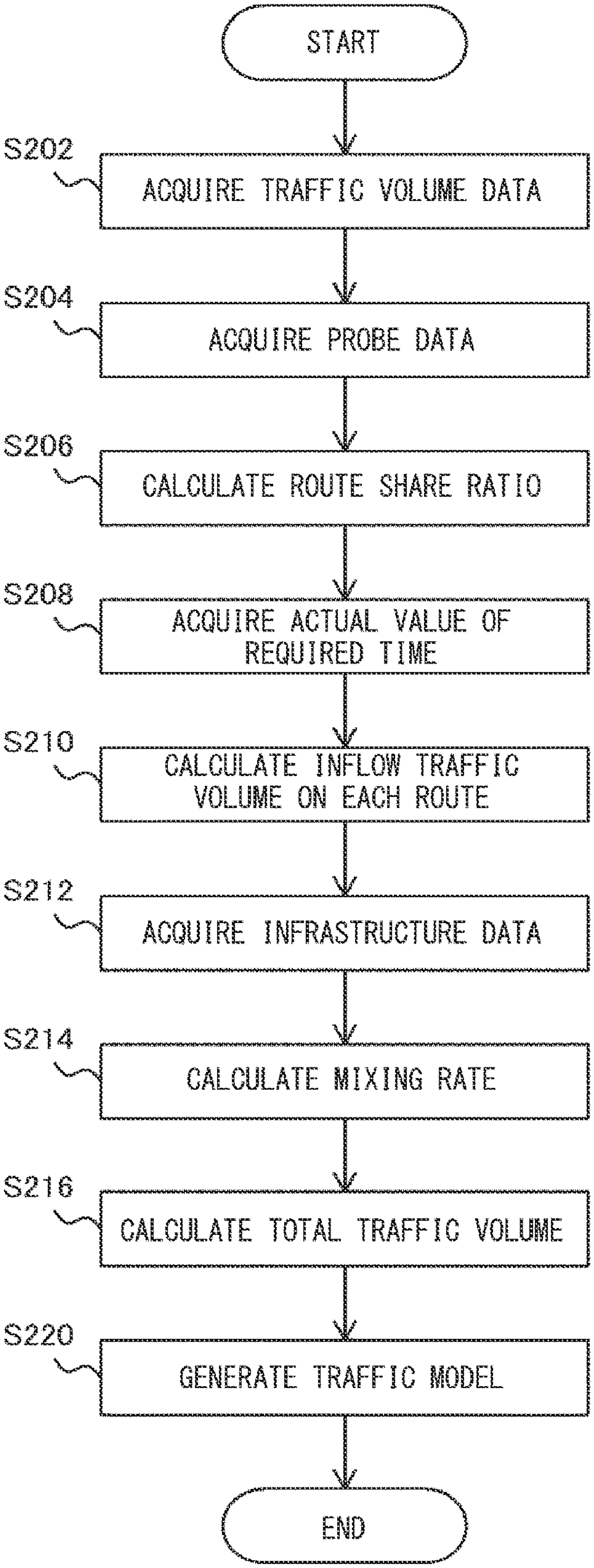
FIG. 18 is a flowchart showing a traffic prediction method executed by a traffic prediction system according to the second embodiment.
Figure 19:
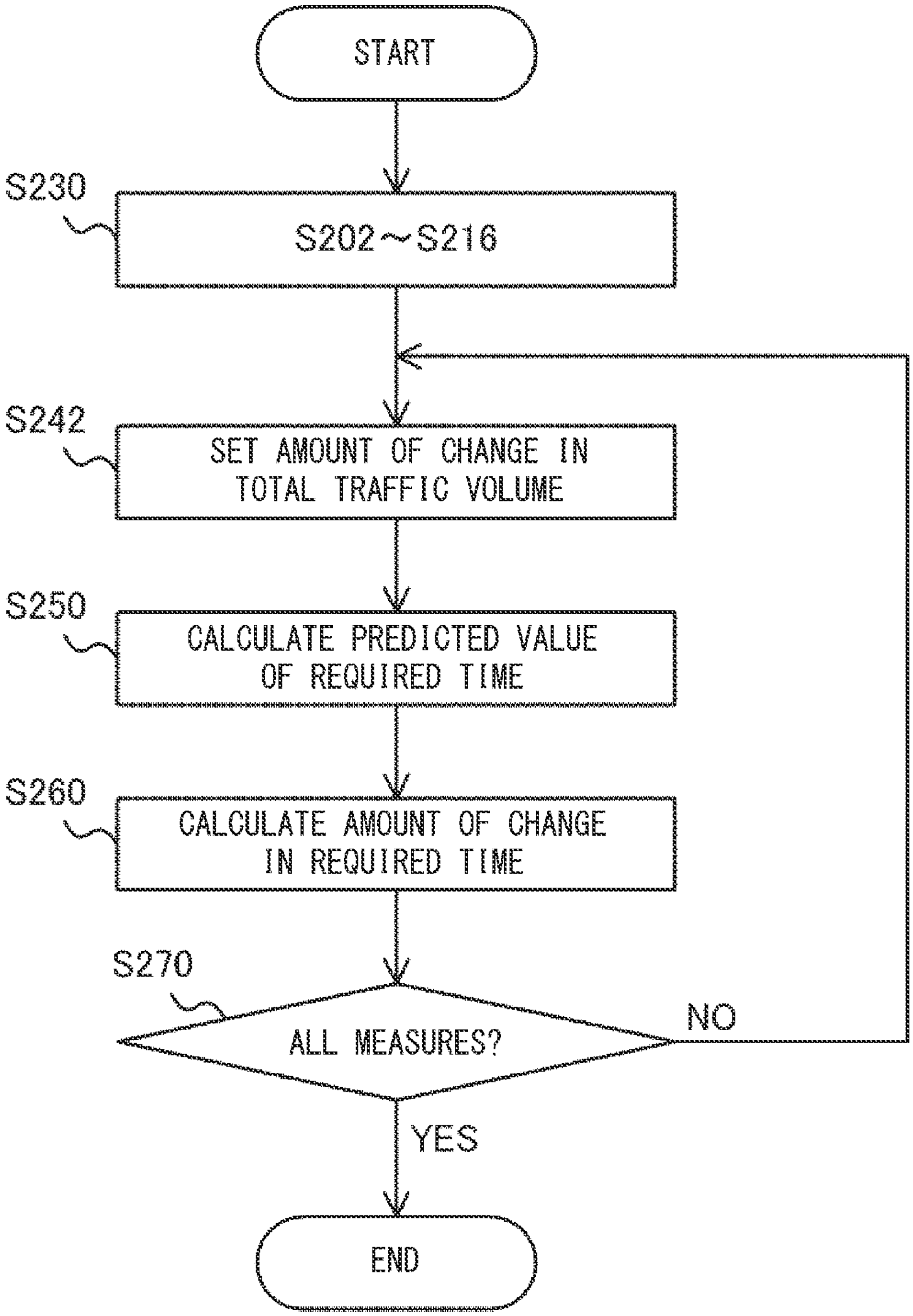
FIG. 19 is a flowchart showing the traffic prediction method executed by the traffic prediction system according to the second embodiment.

FIG. 17 shows a configuration of a traffic prediction apparatus 100 according to the second embodiment. FIGS. 18 and 19 are flowcharts showing a traffic prediction method executed by a traffic prediction system 1 according to the second embodiment. Like the first embodiment, the traffic prediction apparatus 100 according to the second embodiment has a CPU 102, a ROM 104, a RAM 106, and an interface unit 108 as its main hardware configuration.

Like the first embodiment, as functional components, the traffic prediction apparatus 100 according to the second embodiment has a route information storage unit 110, a traffic volume data acquisition unit 112, probe data acquisition unit 114, a route share ratio calculation unit 116, and a required time acquisition unit 118. The traffic prediction apparatus 100 according to the second embodiment has a traffic volume calculation unit 120, a parameter setting unit 128, and a traffic model generation unit 130. In addition, the traffic prediction apparatus 100 according to the second embodiment has an amount of change setting unit 140, a traffic state prediction unit 150, and an amount of change calculation unit 160. The traffic prediction apparatus 100 according to the second embodiment further has an infrastructure data acquisition unit 210, a mixing ratio calculation unit 212, and a total traffic volume calculation unit 220.

In the flowchart shown in FIG. 18, since processing of S202 to S210 is substantially similar to the processing of S102 to S110 shown in FIG. 3, respectively, descriptions thereof are omitted. The infrastructure data acquisition unit 210 acquires the infrastructure data (Step S212). Specifically, the infrastructure data acquisition unit 210 acquires the infrastructure data collected in equipment or the like managed by a road administrator (e.g., administrative agency, etc.) different from the system administrator. The infrastructure data is, for example, data (traffic counter data) collected by traffic counters and the like.

More specifically, the infrastructure data acquisition unit 210 acquires the infrastructure data indicating the traffic volume before and after the predetermined point P in the same direction as the traveling direction of the vehicle on each route. For example, for the route R1 shown as an example in FIG. 6, the infrastructure data acquisition unit 210 acquires the infrastructure data (traffic counter data) from a traffic counter installed closer to the reference point S1 than the predetermined point P and measuring the traffic volume in the same direction as the traveling direction of the route R1. The infrastructure data acquisition unit 210 also acquires the infrastructure data (traffic counter data) from a traffic counter installed on the opposite side of the reference point S1 with respect to the predetermined point P and measuring the traffic volume in the same direction as the traveling direction of the route R1.

The mixing ratio calculation unit 212 calculates a mixing ratio of the target vehicle to the total traffic volume (Step S214). The "total traffic volume" indicates the total traffic volume of each route. In other words, the "total traffic volume" indicates, for each route, the traffic volume of vehicles that are target vehicles and general vehicles other than the target vehicles combined. The "mixing ratio" indicates the traffic volume of the target vehicles (the number of vehicles entering the parking lot per unit time) to the total traffic volume. Specifically, for each route, the mixing ratio calculation unit 212 calculates, in each time, a proportion of the number of vehicles entering the parking lot per unit time indicated by the traffic volume data in the traffic volume indicated by the infrastructure data acquired in S212 as the mixing ratio. As described later with reference to FIG. 20, the mixing ratio changes over time.

The total traffic volume calculation unit 220 calculates the total traffic volume (Step S216). Specifically, the total traffic volume calculation unit 220 calculates the total traffic volume using the mixing ratio calculated in S214 and the inflow traffic volume calculated in S210. More specifically, the total traffic volume calculation unit 220 calculates the total traffic volume of vehicles flowing into each route by dividing the inflow traffic volume by the mixing ratio at each time.

Figure 20:
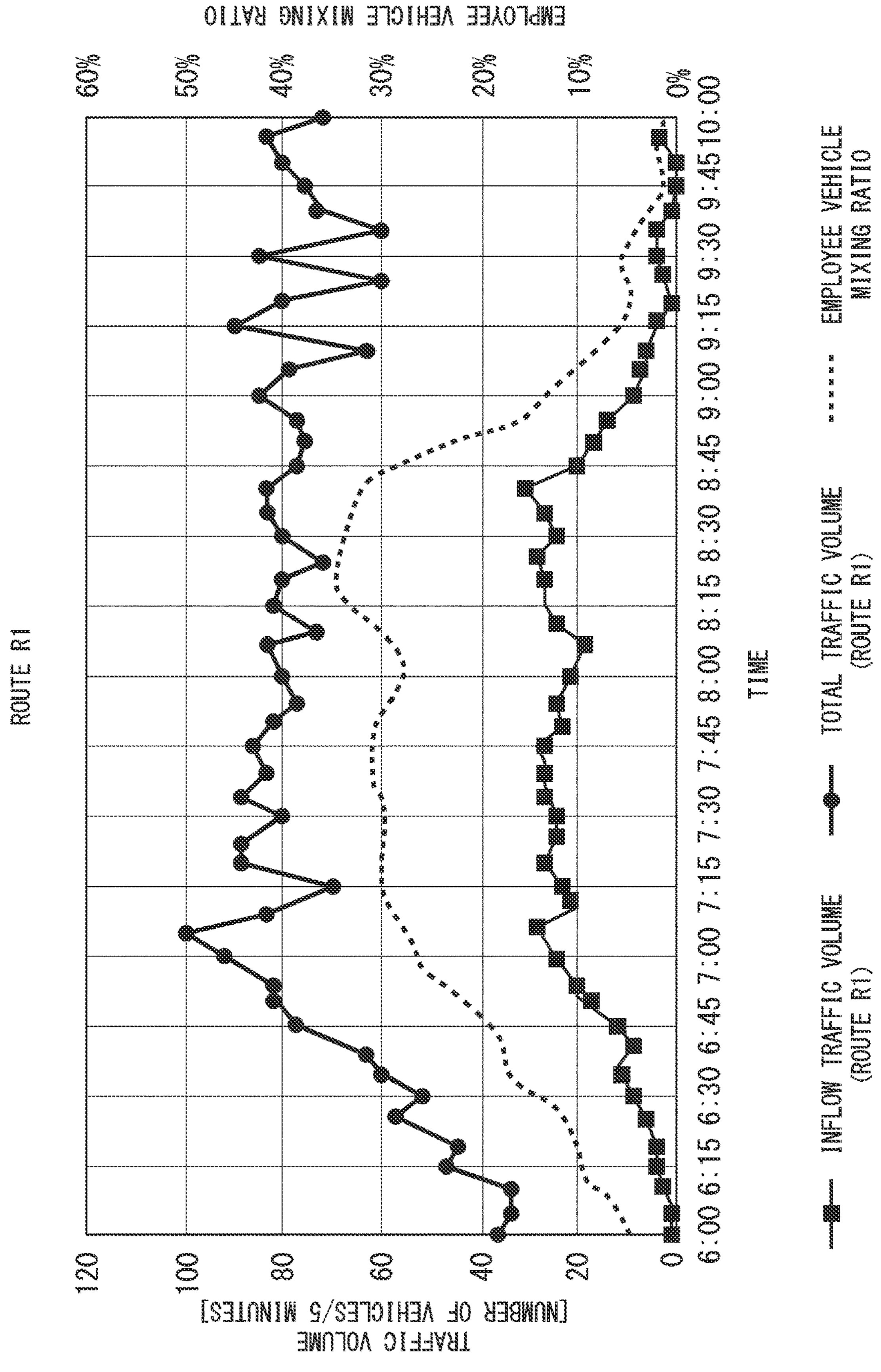
FIG. 20 shows an example of a mixing ratio and a total traffic volume according to the second embodiment.

FIG. 20 shows an example of the mixing ratio and the total traffic volume according to the second embodiment. FIG. 20 is a graph showing an example of the traffic volume and the mixing ratio of the route R1. In the graph shown in FIG. 20, the horizontal axis indicates the time, the vertical axis on the left indicates the traffic volume (the number of vehicles per 5 minutes), and the vertical axis on the right indicates the mixing ratio of employee vehicles. The square dots in FIG. indicate the hourly transition of the inflow traffic volume on the route R1. The squire dots in FIG. 20 correspond to the inflow traffic volume shown in FIG. 9 (indicated by the round dots). The round dots in FIG. 20 indicate the hourly transition of the total traffic volume on the route R1. The dashed line in FIG. 20 indicates the hourly transition in the mixing ratio of the employee vehicles.

In the example in FIG. 20, the mixing ratio of the employee vehicles on the route R1 increased approximately from 5% to 30% during the time periods of "6:00 to 7:00". In addition, the employee vehicle mixing ratio on the route R1 remained at approximately 30% during the time periods of "7:00 to 8:45" and reached about 35% of the peak value during the time period of "8:15". The employee vehicle mixing ratio on the route R1 is reduced approximately from 30% to 5% during the time periods of "8:45 to 9:15". For each time, the mixing ratio calculation unit 212 calculates the total traffic volume indicated by the round dots by dividing the inflow traffic volume indicated by the square dots by the mixing ratio indicated by the dashed lines.

The traffic model generation unit 130 according to the second embodiment generates the traffic model for each route (Step S220). According to the second embodiment, the traffic model generation unit 130 generates the traffic model using the total traffic volume calculated in S216. In the second embodiment, the traffic model is generated by adjusting the parameters of the traffic model so as to reproduce the actual value of the required time acquired in S208 when the total traffic volume of vehicles flowing into the route calculated in S216 is input to the traffic model. Thus, the parameter setting unit 128 can set the bottleneck capacity for the total traffic volume. The traffic model generation unit 130 can also generate a traffic model using the bottleneck capacity corresponding to the total traffic volume as a parameter.

FIG. 19 is a flowchart that uses the traffic model according to the second embodiment to calculate the amount of change in the predicted value of the required time when the inflow traffic volume is changed. Like S132 to S140 of the first embodiment, the traffic prediction apparatus 100 according to the second embodiment performs processing substantially similar to that in S202 to S216 (Step S230). If the inflow traffic volume (total traffic volume) on each route generated in the processing for generating a traffic model (FIG. 18) is also used in the processing of FIG. 19, the processing of S230 may be omitted.

The amount of change setting unit 140 according to the second embodiment sets the amount of change in the total traffic volume of vehicles flowing into the route (Step S242). Specifically, the amount of change setting unit 140 sets the amount of change in the total traffic volume corresponding to the assumed measures. Here, the target to which the measures are applied is employee vehicles (target vehicles). Therefore, the amount of change setting unit 140 according to the second embodiment sets the amount of change taking into account the proportion of the number of vehicles entering the parking lot per unit time (number of vehicles entering the facility) in the total traffic volume. Specifically, the amount of change setting unit 140 according to the second embodiment sets the amount of change at each time (time period) by multiplying the total traffic volume of vehicles flowing into each route by the mixing ratio and the conversion rate.

The traffic state prediction unit 150 according to the second embodiment calculates the predicted value of the required time (Step S250). That is, for each route, the traffic state prediction unit 150 calculates the predicted value of the required time for the total traffic volume calculated in S216 and the predicted value of the required time when the total traffic volume is changed using the traffic model generated in advance in S220. Specifically, the parameters (free flow travel time and bottleneck capacity) of the traffic model are determined in the processing of S220. Next, the traffic state prediction unit 150 inputs the total traffic volume for each time period calculated in the processing of S216 to the traffic model whose parameters are determined to calculate the predicted value of the required time for each time period before the implementation of the measures. Similarly, the traffic state prediction unit 150 inputs the total traffic volume for each time period calculated by adding the amount of change set in the processing of S242 to the traffic model whose parameters are determined to thereby calculate the predicted value of the required time for each time period when the total traffic volume is changed (that is, when the measures are implemented).

The amount of change calculation unit 160 according to the second embodiment calculates the amount of change in the required time (Step S260). That is, for each route, the amount of change calculation unit 160 calculates the amount of change in the predicted value of the required time when the total traffic volume of vehicles flowing into the route is changed. Since the method of calculating the amount of change is substantially the same as in first embodiment, a description thereof is omitted. Next, if the traffic prediction apparatus 100 according to the second embodiment has not completed the processing of S242 to S260 for all measures (NO in Step S270), the processing returns to S242. The traffic prediction apparatus 100 performs the processing of S242 to S260 for the other measures for which the processing has not been completed. On the other hand, when the traffic prediction apparatus 100 completes the processing of S242 to S260 for all measures (YES in S270), the processing ends.

The traffic prediction apparatus 100 according to the second embodiment can predict the change in the required time when the measures are implemented in consideration of the total traffic volume. Therefore, it may be possible to make predictions that are more in line with the actual state of the route. On the other hand, as described in the first embodiment, in this embodiment, it is possible to make predictions of the traffic when a behavior is modified without acquiring the infrastructure data. That is, in the present disclosure, it is possible to make predictions of the change in the required time when a behavior is modified without acquiring the infrastructure data.

Modified Example

It should be noted that the present disclosure is not limited to the above embodiments and can be modified as appropriate without departing from the scope thereof. For example, the order of steps of flowcharts shown in FIGS. 3 to 5 and FIGS. 17 to 19 can be modified as appropriate. Also, one or more steps of flowcharts shown in FIGS. 3 to 5 and FIGS. 17 to 19 may be omitted.

In the above described embodiments, processing is performed for each of the plurality of routes, but the present disclosure is not limited to this configuration. That is, the processing described above may be performed for one route. However, by performing processing for each of the plurality of routes as described above, it is possible to determine which route is the most effective for behavior modification.

In the second embodiment, the total traffic volume is calculated by dividing the inflow traffic volume by the mixing ratio, but the present disclosure is not limited to this configuration. The total traffic volume of the inflow traffic volume may be calculated by dividing the outflow traffic volume by the mixing ratio to calculate the total traffic volume, and then performing the processing shown in FIG. 4 for the total traffic volume of the outflow traffic volume.

In the above examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A traffic prediction system comprising:

hardware, including at least one memory configured to store a computer program and at least one processor configured to execute the computer program;

a traffic data acquisition unit, implemented by the hardware, configured to acquire traffic volume data indicating a relationship between a time and a traffic volume at a predetermined point;

a required time acquisition unit, implemented by the hardware, configured to acquire, for each of a plurality of routes, an actual value of a required time from a reference point of each of the plurality of routes to the predetermined point for a vehicle to arrive at the predetermined point via the route;

a traffic volume calculation unit, implemented by the hardware, configured to calculate an inflow traffic volume of vehicles flowing into each of the plurality of routes from the reference point for each of the plurality of routes, using the traffic volume data and the actual value of the required time;

a traffic state prediction unit, implemented by the hardware, configured to calculate, for each of the plurality of routes, a predicted value of the required time in view of the calculated inflow traffic volume and a predicted value of the required time when the inflow traffic volume is changed using a traffic model generated in advance; and an amount of change calculation unit, implemented by the hardware, configured to calculate, for each of the plurality of routes, an amount of change in the predicted value of the required time when the inflow traffic volume is changed, wherein:

the traffic model is generated by adjusting parameters of the traffic model so as to reproduce the actual value of the required time in a case where the inflow traffic volume is input to the traffic model;

the parameters of the traffic model include a bottleneck capacity of each of the plurality of routes for each time, a value of the bottleneck capacity different each time; and the traffic model reproduces the actual value of the required time including a holdup time obtained by dividing a first value, obtained by subtracting the outflow accumulated traffic volume from the inflow accumulated traffic volume, by the bottleneck capacity.

2. The traffic prediction system according to claim 1, wherein the required time acquisition unit is configured to acquire the actual value of the required time using travel performance data obtained from each of specific vehicles passing through the route.

3. The traffic prediction system according to claim 1, wherein the required time acquisition unit acquires the actual value of the required time using travel performance data obtained from each of a plurality of the specific vehicles passing through each of the plurality of the routes, and the traffic volume calculation unit calculates the inflow traffic volume on each of the plurality of the routes, using a share ratio of each route to the traffic volume in the traffic volume data, the share ratio being calculated based on the number of the specific vehicles passing through each of the plurality of the routes.

4. The traffic prediction system according to claim 3, wherein the traffic volume calculation unit calculates an outflow accumulated traffic volume using the share ratio, the outflow accumulated traffic volume being an accumulation of an outflow traffic volume of vehicles outflowing from each of the plurality of routes in the traffic volume in the traffic volume data, and the traffic volume calculation unit calculates an inflow accumulated traffic volume using the outflow accumulated traffic volume and the actual value of the required time, the inflow accumulated traffic volume being an accumulation of the inflow traffic volume, and the traffic volume calculation unit calculates the inflow traffic volume in each time from the inflow accumulated traffic volume.

5. A traffic prediction method comprising:

acquiring traffic volume data indicating a relationship between a time and a traffic volume at a predetermined point;

acquiring, for each of a plurality of routes, an actual value of a required time from a reference point of each of the plurality of routes to the predetermined point for a vehicle to arrive at the predetermined point via the route;

calculating an inflow traffic volume of vehicles flowing into each of the plurality of routes from the reference point for each of the plurality of routes, using the traffic volume data and the actual value of the required time;

calculating, for each of the plurality of routes, a predicted value of the required time in view of the calculated inflow traffic volume and a predicted value of the required time when the inflow traffic volume is changed using a traffic model generated in advance; and calculating, for each of the plurality of routes, an amount of change in the predicted value of the required time when the inflow traffic volume is changed, wherein the traffic model is generated by adjusting parameters of the traffic model so as to reproduce the actual value of the required time in a case where the inflow traffic volume is input to the traffic model;

the parameters of the traffic model include a bottleneck capacity of each of the plurality of routes for each time, a value of the bottleneck capacity different each time; and the traffic model reproduces the actual value of the required time including a holdup time obtained by dividing a first value, obtained by subtracting the outflow accumulated traffic volume from the inflow accumulated traffic volume, by the bottleneck capacity.

6. A non-transitory computer readable medium storing a program for causing a computer to execute processing of:

acquiring traffic volume data indicating a relationship between a time and a traffic volume at a predetermined point;

acquiring, for each of a plurality of routes, an actual value of a required time from a reference point of each of the plurality of routes to the predetermined point for a vehicle to arrive at the predetermined point via the route;

calculating an inflow traffic volume of vehicles flowing into each of the plurality of routes from the reference point for each of the plurality of routes, using the traffic volume data and the actual value of the required time;

calculating, for each of the plurality of routes, a predicted value of the required time in view of the calculated inflow traffic volume and a predicted value of the required time when the inflow traffic volume is changed using a traffic model generated in advance; and calculating, for each of the plurality of routes, an amount of change in the predicted value of the required time when the inflow traffic volume is changed, wherein the traffic model is generated by adjusting parameters of the traffic model so as to reproduce the actual value of the required time in a case where the inflow traffic volume is input to the traffic model;

the parameters of the traffic model include a bottleneck capacity of each of the plurality of routes for each time, a value of the bottleneck capacity different each time; and the traffic model reproduces the actual value of the required time including a holdup time obtained by dividing a first value, obtained by subtracting the outflow accumulated traffic volume from the inflow accumulated traffic volume, by the bottleneck capacity.

* * * * *